United States Patent
Niu et al.

(10) Patent No.: US 12,369,131 B2
(45) Date of Patent: Jul. 22, 2025

(54) CONTROL INFORMATION FOR SMART REPEATER IN WIRELESS COMMUNICATION SYSTEM

(71) Applicant: APPLE INC., Cupertino, CA (US)

(72) Inventors: Huaning Niu, San Jose, CA (US); Chunxuan Ye, San Diego, CA (US); Dawei Zhang, Saratoga, CA (US); Oghenekome Oteri, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 344 days.

(21) Appl. No.: 18/049,698

(22) Filed: Oct. 26, 2022

(65) Prior Publication Data

US 2023/0217381 A1 Jul. 6, 2023

Related U.S. Application Data

(60) Provisional application No. 63/266,209, filed on Dec. 30, 2021.

(51) Int. Cl.
| | | |
|---|---|---|
| *H04L 5/00* | (2006.01) | |
| *H04B 7/155* | (2006.01) | |
| *H04L 5/14* | (2006.01) | |
| *H04W 16/28* | (2009.01) | |
| *H04W 56/00* | (2009.01) | |

(52) U.S. Cl.
CPC ......... *H04W 56/001* (2013.01); *H04L 5/1469* (2013.01); *H04W 16/28* (2013.01)

(58) Field of Classification Search
CPC ... H04W 56/001; H04W 16/28; H04W 16/26; H04W 72/0453; H04L 5/1469; H04L 5/005; H04L 5/006; H04L 5/0025; H04B 7/04013; H04B 7/15528
USPC .......................................................... 370/329
See application file for complete search history.

(56) References Cited

U.S. PATENT DOCUMENTS

| | | | |
|---|---|---|---|
| 11,665,613 B1* | 5/2023 | Hindy ................. | H04W 40/005 709/220 |
| 2021/0068050 A1* | 3/2021 | Sampath ............... | H04W 48/10 |
| 2021/0185588 A1* | 6/2021 | Ray Chaudhuri .......................... H04W 72/0446 | |
| 2021/0298069 A1* | 9/2021 | Abedini ............ | H04W 74/0833 |
| 2022/0174509 A1* | 6/2022 | Noh ..................... | H04B 7/15528 |
| 2022/0311487 A1* | 9/2022 | Abedini ............... | H04B 7/0617 |
| 2023/0008206 A1* | 1/2023 | Yang ..................... | H04W 76/15 |

(Continued)

*Primary Examiner* — Thuong Nguyen
(74) *Attorney, Agent, or Firm* — Dorsey & Whitney LLP

(57) ABSTRACT

Systems and method for using control information to control the relay of signaling between a base station and a user equipment (UE) using a smart repeater (SMR) and/or reconfigurable intelligent surface (RIS) are disclosed herein. In embodiments, a first phase is used by the SMR with a first SS burst from a base station to identify a trained Rx beam to use with the base station, and a second phase receives a second SS burst from the base station and forwards it to a UE using a beam sweep such that the UE is enabled to provide feedback of one SSB of the second SS burst. In other embodiments, an SMR or an RIS is controlled to enable the use of an SS burst to perform a full check of all beam-wise routes between the base station and the UE, enabling feedback of a corresponding SSB selection by the UE.

20 Claims, 16 Drawing Sheets

(56) References Cited

U.S. PATENT DOCUMENTS

2023/0026516 A1* 1/2023 Luo .................... H04B 7/15535
2023/0362857 A1* 11/2023 Ghanbarinejad . H04W 56/0045

* cited by examiner

CONTROL INFORMATION FOR SMART REPEATER IN WIRELESS COMMUNICATION SYSTEM

TECHNICAL FIELD

This application relates generally to wireless communication systems, including wireless communications systems using smart repeaters (SMRs) and/or reconfigurable intelligent surfaces (RISs) to relay signaling between, for example, a base station and a user equipment (UE).

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Note that in some systems, FR2 may also include frequency bands from 52.6 GHz to 71 GHz (or beyond). Bands in the millimeter wave (mmWave) range of FR2 may have smaller coverage but potentially higher available bandwidth than bands in FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
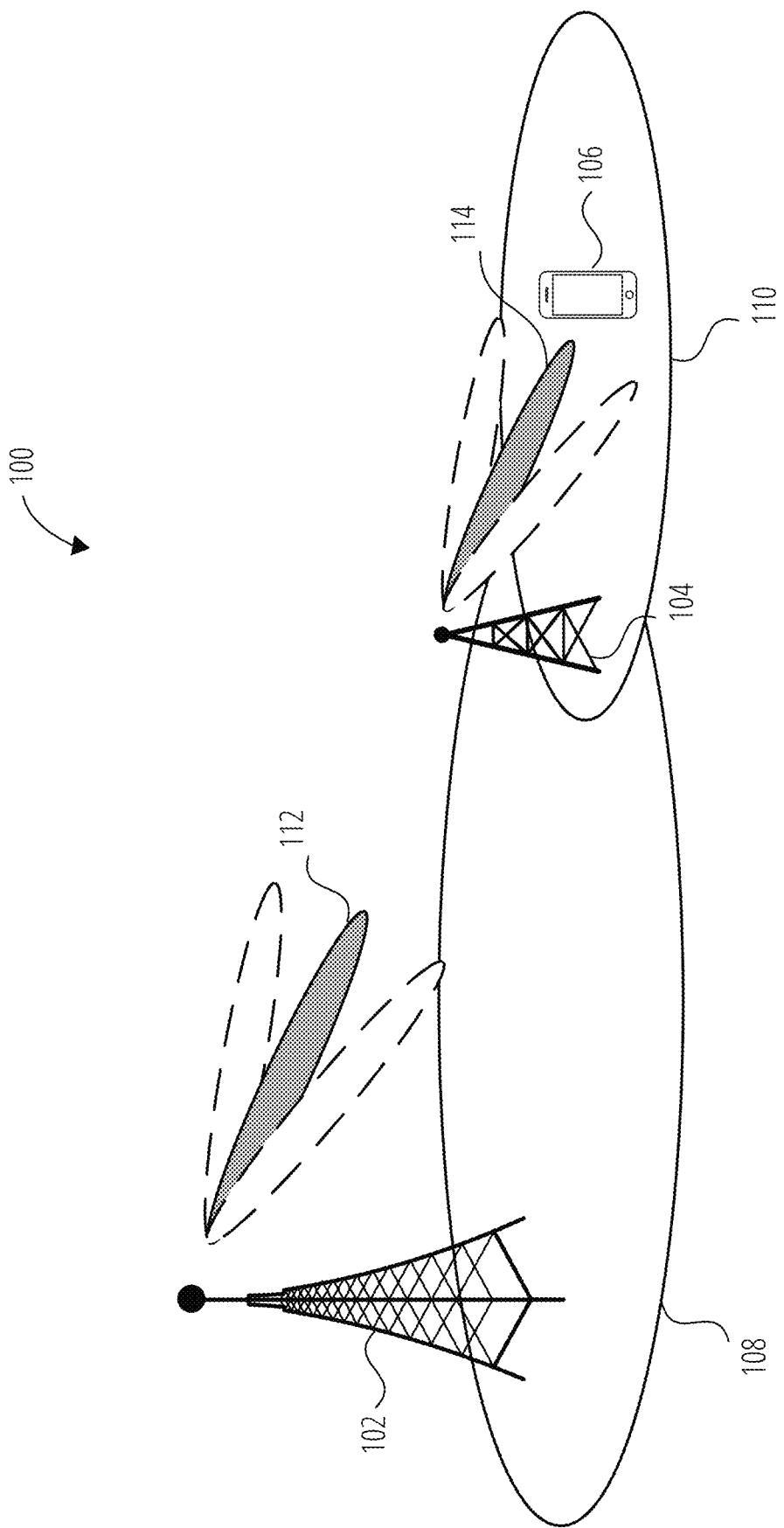
FIG. 1 illustrates a wireless communication system where a base station uses an SMR to communicate with a UE, according to an embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

UE coverage is a fundamental aspect of wireless communication system deployments. Mobile operators may rely on different types of network nodes to offer blanket coverage in their deployments. The deployment of full-stack cells within a wireless communication system is one option for providing UE coverage, but a full stack cell may not be always possible or economically viable in every location (e.g., in cases where there is no availability of a backhaul from the location to the core network, and/or an unreasonable amount of expense for establishing such a backhaul and/or the full-stack cell). Additionally or alternatively, UE coverage may also be impacted due to interference (e.g., an obstruction between a UE and a base station) where coverage might otherwise be sufficient (e.g., without the obstruction).

These considerations may be particularly relevant in the case of higher frequency operation of the cell (e.g., in FR2), due to the tendency of such relatively higher frequency signaling to be more impacted by interference sources and/or to have a lesser transmission range than relatively lower frequency signaling.

In view of the need to provide robust coverage even in view of any interference considerations, new types of network nodes and/or other devices are considered to increase mobile operators' flexibility for their wireless communication system network deployments.

An example of a new network node that accomplishes coverage improvement and/or range extension within a wireless communication system is a smart repeater (SMR). An SMR may connect to one or more UE and communicate signals back and forth between the one or more UE that are served by the SMR and the base station via a link (e.g., a Un link) between the SMR and the base station. This may be useful in the case where, for example, the base station (e.g., having the backhaul to the core network of the wireless communication system) cannot directly serve the UE (e.g., due to distance and/or interference), but the SMR can directly serve the UE. The link between the SMR and the base station may be possible because of, for example, an ability of the SMR and/or the base station to use a necessary transmission power and/or more accurate and/or precise beamforming (e.g., greater/better than that which can reasonably be provided for a regular use case of a UE), and/or due to less/no interference (e.g., due to obstruction) within the channel between the SMR and the base station.

Through this relaying between the SMR and the base station, the effective possible coverage range and/or perceived signaling strength at the UE within the wireless communication network is improved. For example, an effective range of a cell could be extended via the SMR via the repetition of signaling on the cell by the SMR. Additionally or alternatively, the SMR may overcome interference issues by, for example, enabling spatial redirection of signaling around an obstruction and/or by increasing signal penetration (e.g., outdoor to indoor (O2I) penetration) through an obstruction (supposing a relatively smaller proximity between the SMR and the obstruction).

An SMR may itself be enhanced over conventional RF repeaters with the capabilities to receive, process, and implement SMR control information from the network (e.g., as received from the base station). Among other things, SMR control information could allow an SMR to perform any amplify-and-forward operations in a more efficient manner. Potential benefits stemming from the use of such SMR control information may include mitigation of unnecessary noise amplification, better spatial directivity for SMR transmissions and/or receptions, and/or simplified network integration between the SMR and a base station. Note that herein, such SMR control information may be referred to more simply as "control information," and context will make it apparent that such information is SMR control information (e.g., control information between the base station and the SMR).

An SMR may be capable of sending beamformed signals to one or more of the UEs that it serves. It is contemplated that one or more of the above benefits could be achieved by using SMR control information to enable network control/influence (at least in part) of beamforming operation at an SMR. Accordingly, disclosed herein are embodiments that use beam-formed communications by an SMR, such that spectrum efficiency and coverage aspects related to the SMR may be improved.

FIG. 1 illustrates a wireless communication system 100 where a base station 102 uses an SMR 104 to communicate with a UE 106, according to an embodiment. As illustrated in the embodiment of FIG. 1, the UE 106 is presently outside of the base station coverage 108 directly provided by the base station 102. However, the UE 106 is within the SMR coverage 110 directly provided by the SMR 104. Accordingly, communication may be enabled between the base station 102 and the UE 106 by relaying information (e.g., data information and/or control information, as the case may be) between the base station 102 and the UE 106 via the SMR 104.

As illustrated, the base station 102 may use beamforming techniques to enable and/or improve its communication with the SMR 104. For example, in FIG. 1, the base station 102 communicates with the SMR 104 on a first base station beam 112. It will be understood that the first base station beam 112 could be used for sending transmissions from the base station 102 to the SMR 104 (e.g., used as a base station transmit (Tx) beam) and/or could be used to receive transmissions from the SMR 104 at the base station 102 (e.g., used as a base station receive (Rx) beam). Note that while the use of only one first base station beam 112 between the base station 102 and the SMR 104 is illustrated, persons of ordinary skill in the art will understand that multiple such base station beams between the base station 102 and the SMR 104 could be simultaneously used in other embodiments.

As illustrated, the SMR 104 may use beamforming techniques to enable and/or improve its communication with the UE 106. For example, in FIG. 1, the SMR 104 communicates with the UE 106 on a first SMR beam 114. It will be understood that the first SMR beam 114 could be used for sending transmissions from the SMR 104 to the UE 106 (e.g., used as an SMR Tx beam) and/or could be used to receive transmissions from the UE 106 at the SMR 104 (e.g., used as an SMR Rx beam). Note that while the use of only one first SMR beam 114 between the SMR 104 and the UE 106 is illustrated, persons of ordinary skill in the art will understand that multiple such SMR beams between the SMR 104 and the UE 106 could be simultaneously used in other embodiments. This may be understood to be an adaptive beamforming capability.

While not expressly illustrated, it is also contemplated that the SMR 104 may use one or more SMR Tx and/or SMR Rx beams to communicate with the base station 102. Further, if the UE 106 is beamforming enabled, it is (also) contemplated that the UE 106 may use one or more UE Tx and/or UE Rx beams to communicate with the SMR 104.

An example of a new network node that accomplishes coverage improvement and/or range extension within a wireless communication system is a reconfigurable intelligent surface (RIS). An RIS may be a surface that is made up of one or more elements (RIS elements) and that is configured to reflect, refract, re-polarize, split, absorb, focus, collimate, and/or effectuate analog processing on signals received at the RIS. The behavior of the RIS in this regard may be defined by a response matrix that defines the individual behavior at one or more elements of the RIS. An RIS may include a control module that can implement a response matrix (e.g., as received at the RIS from a base station in RIS control information) by configuring the elements of the RIS according to the response matrix. Note that herein, such RIS control information may be referred to more simply as "control information," and context will make it apparent that such information is RIS control information (e.g., control information between the base station and the RIS).

An RIS may be useful in a case where, for example, a cell has an area of poor signal strength due to an obstruction within the cell between the base station and a UE (and, e.g., where that area would otherwise have a stronger signal strength without the obstruction). The RIS can be physically placed at a location that is unobstructed relative to each of the base station and the UE, and can then be configured such that it relays signals received from each of the base station and the UE in such a manner that that these can be perceived at the other device.

The response matrix of the RIS may be (re)configurable such that the RIS effectively receives signaling on one or more beams according to a first beamforming comprising one or more beams and/or relays this signaling such that it leaves the RIS according to a second beamforming comprising one or more beams.

Figure 2:
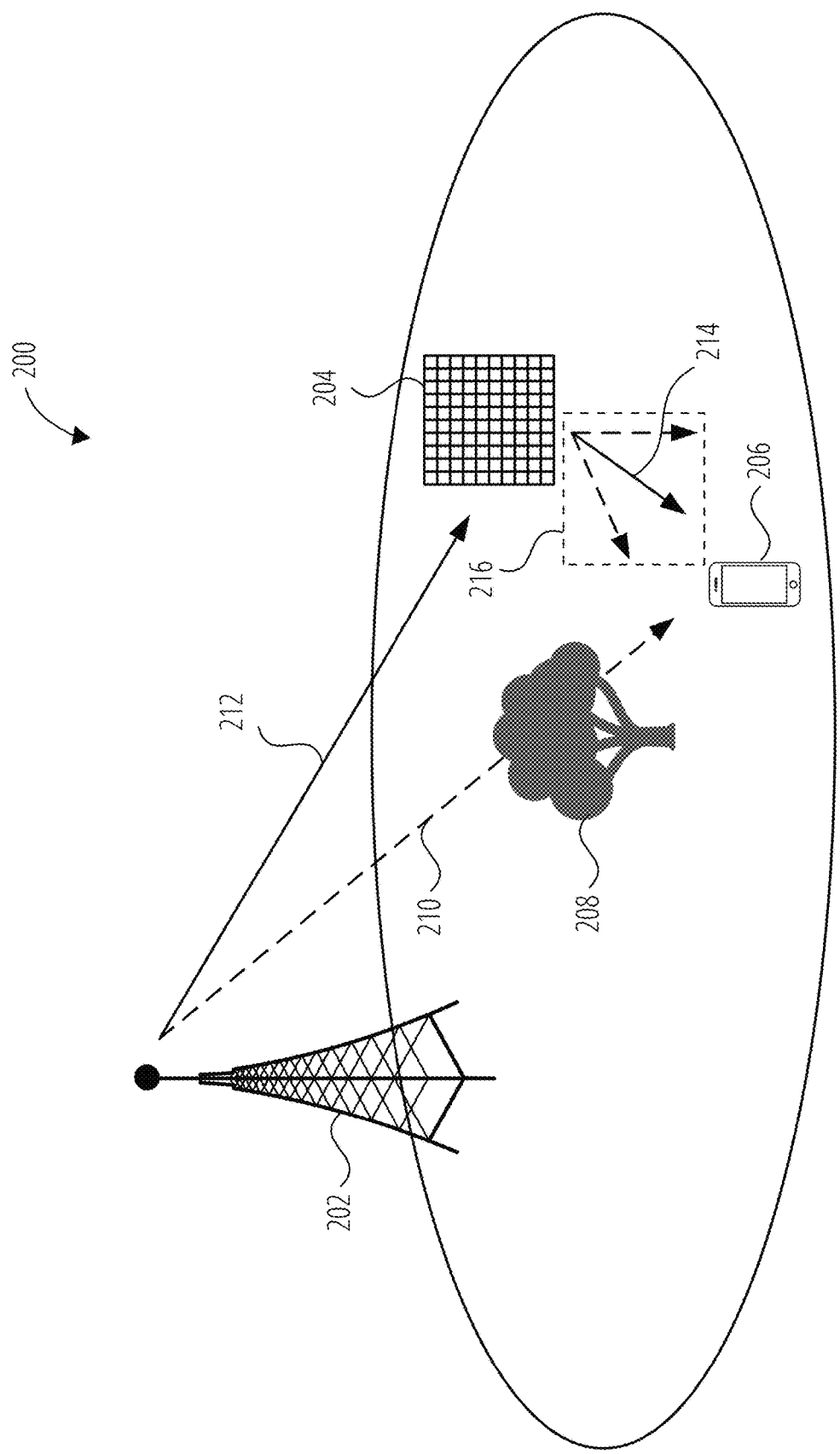
FIG. 2 illustrates a wireless communication system where a base station uses an RIS to communicate with a UE, according to an embodiment.

FIG. 2 illustrates a wireless communication system 200 where a base station 202 uses an RIS 204 to communicate with a UE 206, according to an embodiment. As illustrated in the embodiment of FIG. 2, the first signaling 210 from the base station 202 and to UE 206 is presently interfered with due to the presence of the obstruction 208. However, the placement of the RIS 204 is such that second signaling 212 from the base station 202 and the RIS 204 is possible. This second signaling 212 is then relayed into third signaling 214 that reaches the UE 206.

FIG. 2 illustrates that, due to the configuration matrix currently in use by the RIS 204, the second signaling 212 is relayed into a plurality of signals 216, with the third signaling 214 within the plurality of signals 216 reaching the UE 206.

The configuration of the RIS 204 may be such that signaling for the RIS 204 (such as, but not limited to, the second signaling 212) is received at the RIS 204 on a Rx beam of the RIS 204 (an RIS Rx beam) and that one or more signals sent in response to the behavior effected by the RIS 204 each occur on a respective Tx beam of the RIS 204 (an RIS Tx beam). In such cases, it may be that a 1:1 correspondence between and signals received on respective RIS Rx beams and signals occurring on respective Rx beams is provided for by the configuration of the RIS 204, but this is not strictly required.

It will be understood that for UL signaling from the UE 206 to the base station 202, an analogous route via the RIS 204 (in the other direction) may be used, and analogous considerations (including, e.g., beamforming considerations) as described could also apply in the UL direction.

Figure 3:
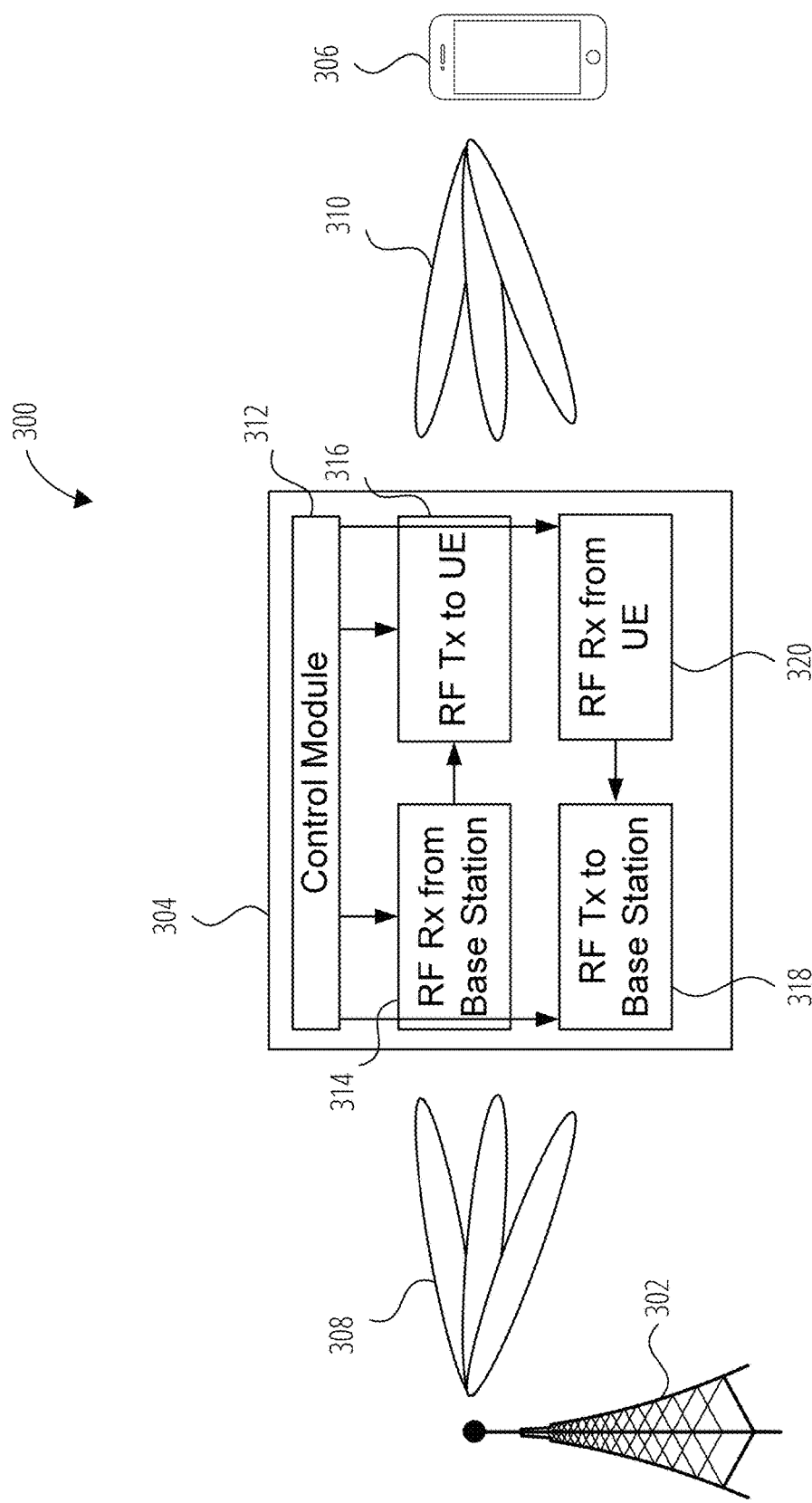
FIG. 3 illustrates a wireless communication system according to embodiments herein.

FIG. 3 illustrates a wireless communication system 300 according to embodiments herein. The wireless communication system 300 includes a base station 302, an SMR 304, and a UE 306. As illustrated, the base station 302 may communicate with the SMR 304 using a base station beamforming 308 (e.g., that is made up of base station Tx or Rx beams, as the case may be), and the UE 306 may communicate with the SMR 304 using a UE beamforming 310 (e.g., that is made up of UE Tx or Rx beams, as the case may be).

The SMR 304 may be a full duplex, non-regenerative repeater. "Non-regenerative" may refer to the case in some embodiments where an SMR does not decode and/or repackage any received signals, but rather relays these signals as received (e.g., after performing adaptive beamforming on the Tx end of the communication through the SMR).

The SMR 304 may comprise a control module 312, a base station Rx RF module 314, a UE Tx RF module 316, a base station Tx RF module 318, and a UE Rx RF module 320. The base station Rx RF module 314 may be used to receive signaling from the base station 302 at the SMR 304. The base station Rx RF module 314 may be configured to cause the SMR 304 to receive such signaling according to a Rx beamforming on one or more Rx beams of the SMR 304.

The UE Tx RF module 316 may be used to transmit signaling from the SMR 304 to the UE 306. The UE Tx RF module 316 may be configured to cause the SMR 304 to transmit such signaling according to a Tx beamforming on one or more Tx beams of the SMR 304.

As illustrated, it is contemplated that signaling may be relayed from the base station 302 to the UE 306 through the use of the base station Rx RF module 314 and the UE Tx RF module 316. In other words, signaling received at the SMR 304 from the base station 302 at the base station Rx RF module 314 may be passed to the UE Tx RF module 316 in order to be transmitted by the SMR 304 to the UE 306.

The base station Tx RF module 318 may be used to transmit signaling from the base SMR 304 to the base station 302. The base station Tx RF module 318 may be configured to cause the SMR 304 to transmit such signaling according to a Tx beamforming on one or more Tx beams of the SMR 304.

The UE Rx RF module 320 may be used to receive signaling from the UE 306 at the SMR 304. The UE Rx RF module 320 may be configured to cause the SMR 304 to receive such signaling according to a Rx beamforming on one or more Rx beams of the SMR 304.

As illustrated, it is contemplated that signaling may be relayed from the UE 306 to the base station 302 through the use of the UE Rx RF module 320 and the base station Tx RF module 318. In other words, signaling received at the SMR 304 from the UE 306 at the UE Rx RF module 320 may be passed to the base station Tx RF module 318 in order to be transmitted by the SMR 304 to the base station 302.

A control module may implement SMR control information that is received from the base station 302. This control information may include control information for beam management for one or more SMR beams (e.g., one or more SMR Tx and/or SMR Rx beams), timing information, information regarding a time division duplex (TDD) configuration used between the base station 302 and the UE 306, and the like. This control information, once decoded, may be used to control one or more of the RF modules 314 through 320 of the SMR 304. For example, this control information may be used to control the beamforming(s) used by one or more of the RF modules 314 through 320, a timing for delineating reception(s)/transmission(s) that are to occur on the RF modules 314 through 320, and/or the assignment of time resources for various receptions and/or transmissions in downlink (DL) and/or uplink (UL) to be performed RF modules 314 through 320, etc.

The control module may be a NR UE modem (like that what would be found on an NR UE). In other cases, it is anticipated that a control module may instead be a lower power/more efficient modem with a more limited data rate as compared to a typical NR UE modem. It is contemplated that such a lower power/more efficient modem could also be suitable as a control module for an RIS (as in the RIS of FIG. 2).

It is noted that one difference between SMR cases (e.g., as illustrated in FIG. 3) and alternative cases where an RIS is used in place of an SMR is that because the RIS establishes its effective beamformings according to a single currently implemented N×N response matrix (denoted Q) at the RIS (where N is the number of RIS elements), as opposed to through the use multiple RF modules (such as the RF modules 314 through 320 of the SMR 304), there may be no ability to use different beamformings for Rx as opposed to Tx at the RIS at the same time (e.g., the RIS will inherently have full correspondence in the Rx and Tx usage cases at each of its effective beams at any one point in time).

Figure 4A:
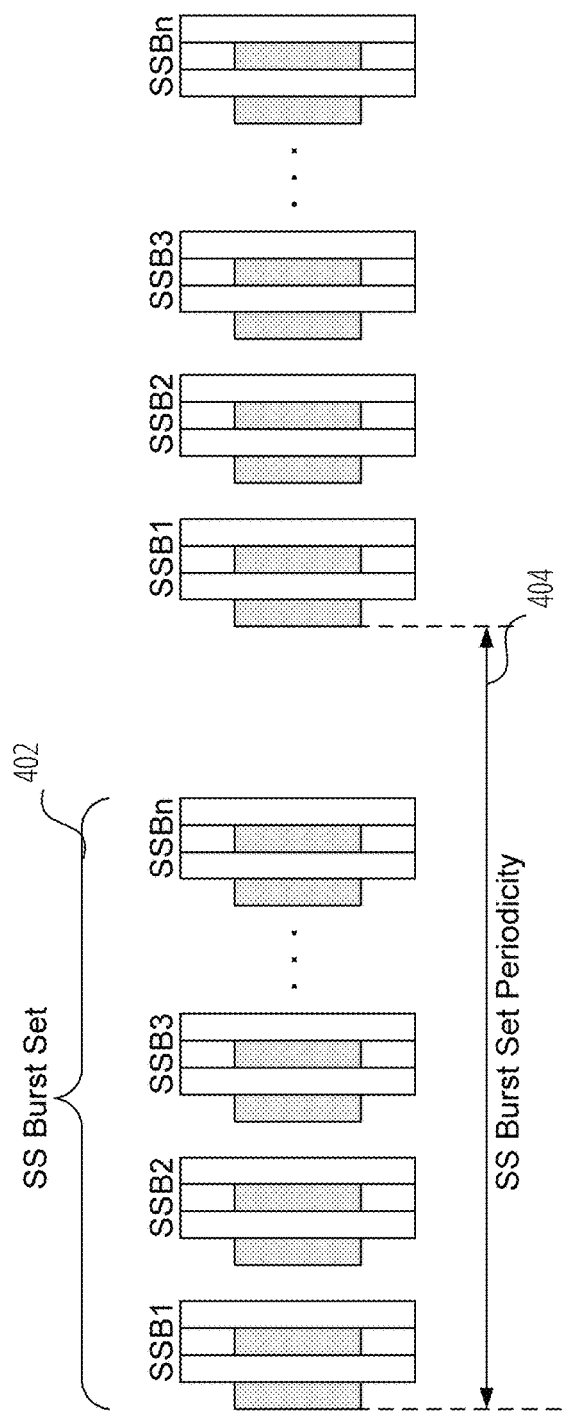
FIG. 4A illustrates the use of a SS burst set in the time domain, according to embodiments herein.

FIG. 4A illustrates the use of a synchronization signal (SS) burst set 402 in the time domain, according to embodiments herein. The SS burst set 402 may be made up of one or more synchronization signal blocks (SSBs) having particular indexes. For example, the SS burst set 402 is made up of SSB1, SSB2, SSB3, . . . SSBn, as illustrated. The number of, and index-wise selection of, SSBs in an SS burst set may vary between various embodiments.

As illustrated, the SSBs of the SS burst set 402 are transmitted sequentially in time during a period of an SS burst set periodicity 404. This sequential transmission may be referred to as a transmission of the SS burst set, or an SS burst (or more simply burst) of the SS burst set. The transmission of the SS burst set may then be repeated during a next period of the SS burst set periodicity at a later time (e.g., a subsequent SS burst of the SS burst set may be performed), as illustrated in FIG. 4A.

Figure 4B:
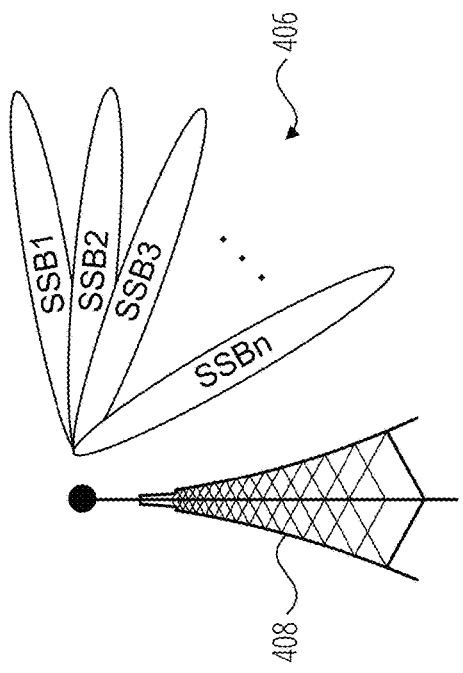
FIG. 4B illustrates a beam sweep associated with the transmission of an SS burst set, according to embodiments herein.

FIG. 4B illustrates a beam sweep 406 associated with the transmission of an SS burst set, according to embodiments herein. The SS burst set uses SSB1, SSB2, SSB3, . . . SSBn. A transmitter 408 (e.g., a base station, an SMR, or the like) that is transmitting the SS burst set may transmit each of these on a corresponding beam of the beam sweep 406, in the manner illustrated.

Because the SSBs are sent on corresponding beams of the beam sweep 406 of varying directionality, a receiver (e.g., a UE, an SMR, or the like (not illustrated)) may perceive a signal strength of each of the various SSBs differently, depending on, for example, the receiver's positioning relative to the transmitter 408 and/or environmental interference effects applicable as between the location of the transmitter 408 and the location of the receiver. The receiver may be able to identify one of the transmitted SSBs with, for example, a highest or best signal strength (relative to its position relative to the transmitter 408), and may use that identified SSB for synchronization with the transmitter 408 and/or for system parameter reception from the transmitter 408 going forward.

If the receiver is capable of Rx beamforming, the receiver may (also) determine an appropriate and/or best receiver Rx beam of a receiver Rx beamforming to use to receive the identified SSB going forward by monitoring multiple such transmissions of the SS burst set (multiple SS bursts of the SS burst set).

Herein, the reception of an SS burst (or a portion of an SS burst) by an entity (e.g., an SMR and/or a UE) will be discussed. When receiving an SS burst (or a portion of an SS burst), it is possible for an entity to receive fewer than all of the associated SSBs (e.g., due to interference and/or directionality of the unreceived SSB(s) relative to the entity). In view of this, it will be recognized that, as used herein, an SS burst (or portion of the SS burst) may be considered "received" by an entity in the case where at least one (but up to all) of the SSBs of that SS burst (or portion of the SS burst) is received at that entity.

Figure 5A:
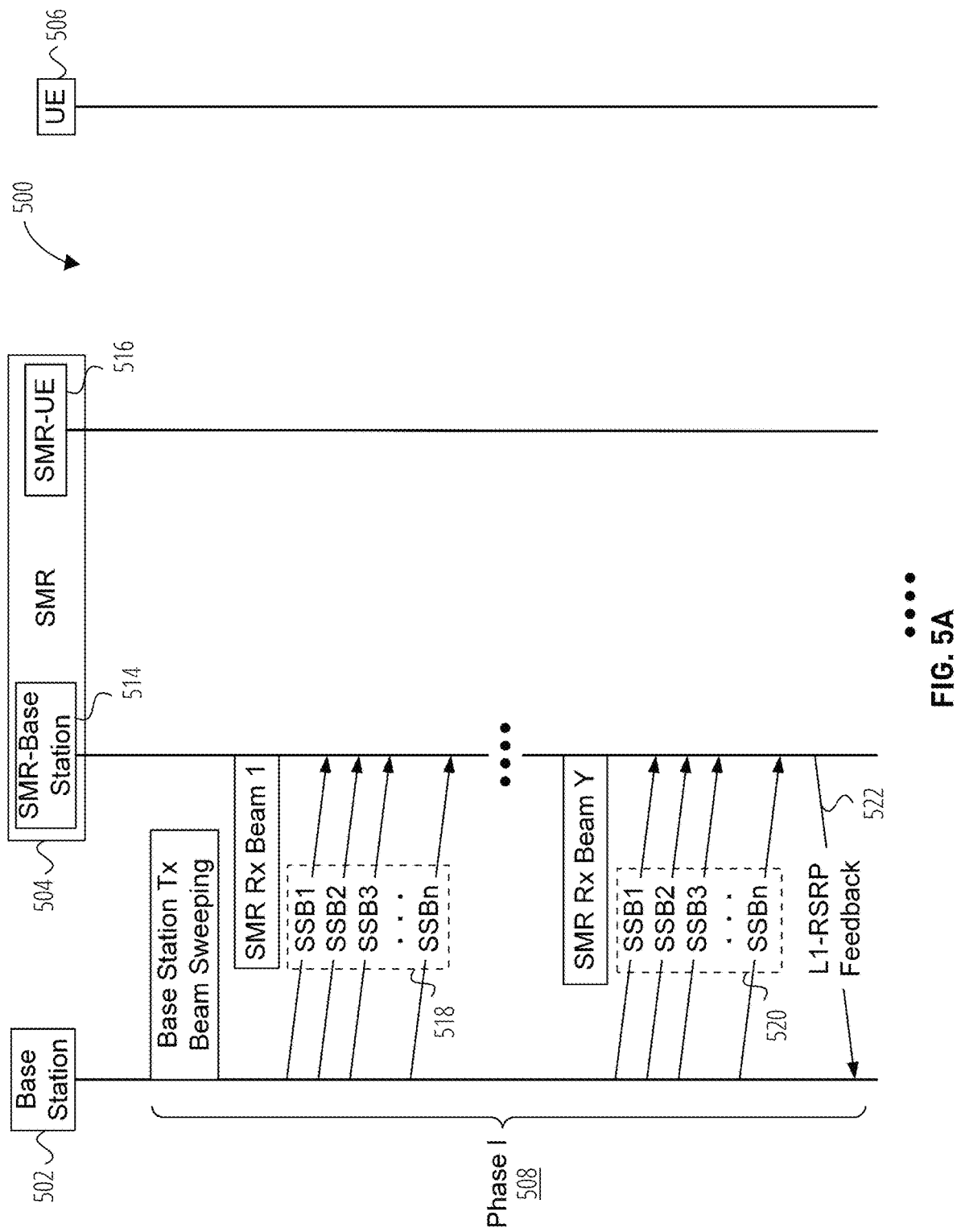
FIG. 5A and FIG. 5B together illustrate a flow diagram for control signaling for beam management between a base station, an SMR, and a UE, according to an embodiment FIG. 6A and FIG. 6B together illustrate a flow diagram for control signaling to beam management between a base station, an SMR, and a UE, according to an embodiment.
Figure 5B:
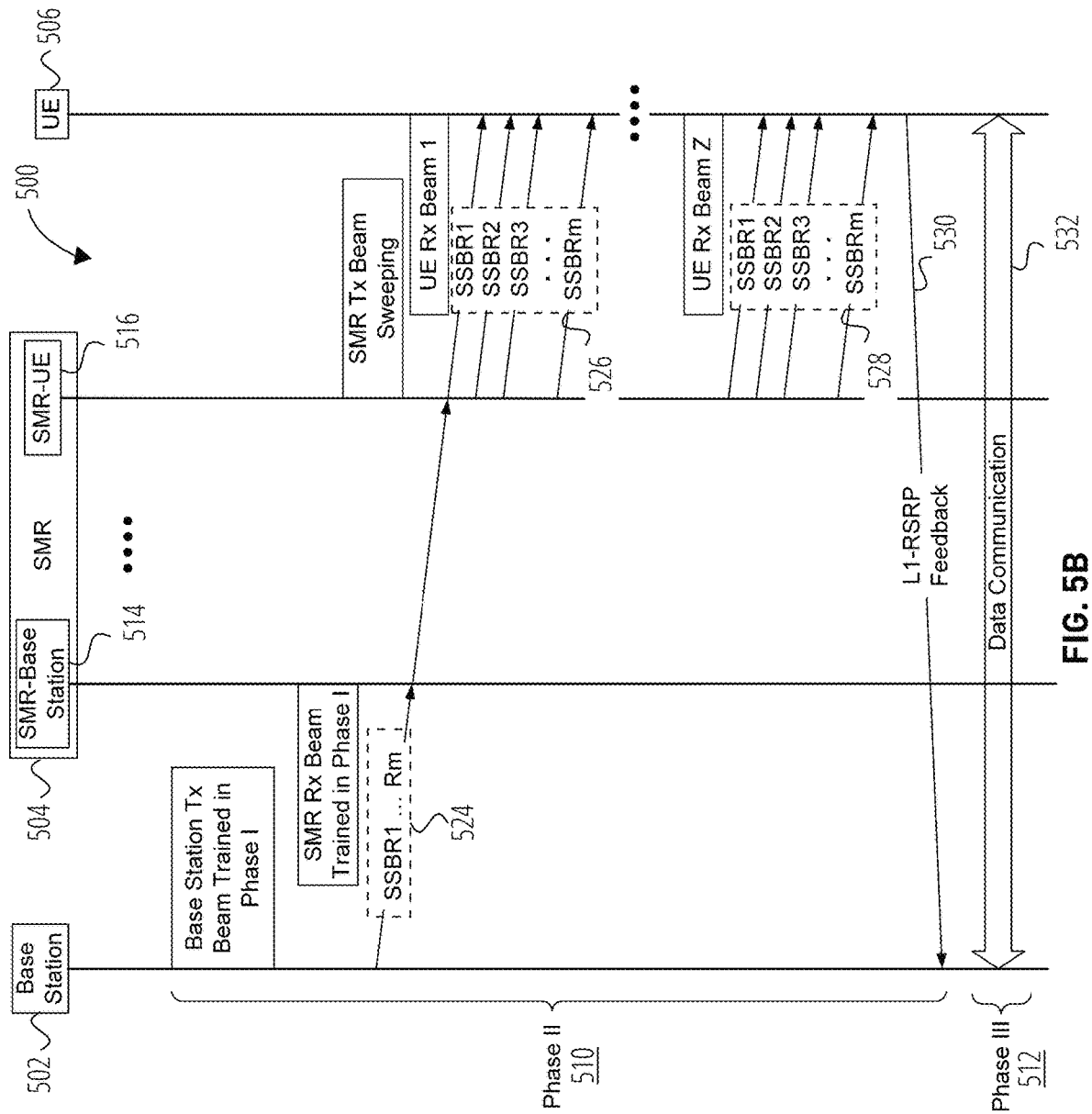

FIG. 5A and FIG. 5B together illustrate a flow diagram 500 for control signaling for beam management between a base station 502, an SMR 504, and a UE 506, according to an embodiment. As illustrated, the flow diagram 500 for this control signaling may be understood according to a first phase 508 (labelled "Phase I" in FIG. 5A) and a second phase 510 (labelled "Phase II" in FIG. 5B). A third phase 512 (labelled "Phase III" in FIG. 5B) for data communication is also illustrated. As can be seen in the flow diagram 500, the SMR 504 send/receives signaling to/from the base station 502 according to SMR to base station functionality 514, and sends/receives signaling to/from the SMR 504 to the UE 506 according to SMR to UE functionality 516. The SMR to base station functionality 514 may be understood to be accomplished via, for example a base station Rx RF module of the SMR 504 and a base station Tx RF module of the SMR 504 (such as the base station Rx RF module 314 and the base station Tx RF module 318 described in relation to FIG. 3). The SMR to UE functionality 516 may be understood to be accomplished via, for example, a UE Tx RF module of the SMR 504 and a UE Rx RF module of the SMR 504 (such as the UE Tx RF module 316 and the UE Rx RF module 320 described in relation to FIG. 3).

In the embodiment of FIG. 5A and FIG. 5B, a control module of the SMR 504 may comprise a NR UE modem. In this embodiment, the control module may share Tx/Rx characteristics for a control plane connection between the base station 502 and the SMR 504 (e.g., via the SMR to base station functionality 514). This may enable the control module to communicate with the base station 502 back along the same route upon which SMR control information was received in response to that SMR control information.

The first phase 508 contemplates the use of a first SS burst set. During the first phase 508, beam management between the base station 502 and the SMR to base station functionality 514 of the SMR 504 is performed. As illustrated, the base station 502 sends a first SS burst of the first SS burst set 518 to the SMR 504. This first SS burst of the first SS burst set 518 may contain a plurality of SSBs of the first SS burst set, and each such SSB may be sent on a separate base station Tx beam used by the base station 502 (e.g., as illustrated by the note "Base Station Tx Beam Sweeping").

The base station Rx RF module of the SMR to base station functionality 514 may be capable of using up to Y SMR Rx beams. Accordingly, SS bursts of the first SS burst set may, in such embodiments, be repeatedly transmitted up to Y times (with the Yth SS burst of the first SS burst set 520 illustrated in FIG. 5A). This repetition allows the SMR to base station functionality 514 of the SMR 504 to receive each SSB of the first SS burst set on an SS burst for each such SMR Rx beam. Then, processing corresponding to each such receipt is performed, such that an SSB of the first SS burst set having a highest signal quality (as processed on an identified one of the SMR Rx beams) is identified. This signal quality measure may be, for example, a measure of reference signal received power (RSRP) or a measure of reference signal received quality (RSRQ). The SMR 504 accordingly identifies the SMR Rx beam upon which this SSB was received with the highest signal quality. At this stage, this SMR Rx beam may be considered a "trained" SMR Rx beam.

The SMR 504 may then provide first L1-RSRP feedback 522 to the base station 502. This first L1-RSRP feedback 522 identifies the SSB that had the highest signal quality, determined as previously described. For example, the first L1-RSRP feedback 522 may indicate an RSRP measured quantity value that is based on an absolute L1-RSRP measurement for the SSB of the SS burst set that had the highest signal quality (e.g., as received on the trained SMR Rx beam), thereby identifying this SSB to the base station 502. Accordingly, the base station is made aware that the best base station Tx beam for communicating with the SMR 504 is the base station Tx beam that was used to send the identified SSB.

It is contemplated that the procedure illustrated in first phase 508 may be repeated periodically, in order to ensure over time that any identified base station Tx beam and/or trained SMR Rx beam (as identified using the first phase 508) are the "best" beams/beam pair between the base station 502 and the SMR 504. However, due to the stationary nature of the SMR 504 (and the base station 502), it may be anticipated that the status of a these beams as a "best" beams/beam pair may shift infrequently and/or sporadically (e.g., at a rate at which relevant obstructions are introduced and/or removed from the local environment, which may not be frequent). Accordingly, a periodicity for performing the first phase 508 may be fairly long. It is contemplated that in some embodiments, if a new obstruction between the base station and the repeater causes a L1-RSRP of the indicated SSB as received on the trained SMR Rx beam to fall below an L1-RSRP of another SSB (on whatever SMR Rx beam), the first L1-RSRP feedback 522 portion of the first phase 508 can be triggered outside of this periodicity to indicate this better SSB to the base station 502.

During the first phase 508, it may be that no transmissions occur between the SMR 504 and the UE 506. Accordingly, SMR RF modules corresponding to the SMR to UE functionality 516 (such as a UE Tx RF module and/or a UE Rx RF module for the SMR to UE functionality 516) may be off during this stage (e.g., to promote power savings).

During the second phase 510, beam management between the SMR to UE functionality 516 of the SMR 504 and the UE 506 is performed. The control module of the SMR 504 performs baseband processing to process control signaling received from the base station 502 for controlling this beam management procedure.

The second phase 510 contemplates the use of a second SS burst set (e.g., that is different than the first SS burst set used during the first phase 508). As illustrated, the base station 502 sends the SSBs of the second SS burst set 524 to the SMR 504. The SSBs of the second SS burst set 524 may be different than the SSBs of the first SS burst set that was used during the first phase 508. The SSBs of the second SS burst set 524 may be SSBs within the wireless communication system that are designated for beam management between the SMR 504 and the UE 506 (e.g., as opposed to use for beam management between the base station 502 and the SMR 504 and/or a UE directly served by the base station 502). Accordingly, in FIG. 5B, the indexes of the SSBs of the second SS burst set 524 are shown to include an "R" (e.g., to visually differentiate them from the SSBs of the first SS burst set used during the first phase 508).

The number of the SSBs of the second SS burst set 524 may be determined by the base station 502 according to SMR codebook information received in a feedback message from the SMR 504 to the base station 502 (e.g., that may occur prior to the first phase 508, or at least prior to the second phase 510). Specifically, this codebook information informs the base station 502 of a Tx beamforming codebook that will be used by a UE Tx RF module of the SMR to UE functionality 516 of the SMR 504. Accordingly, the base station 502 is made aware of the number of Tx beams that are/can be used at the SMR to UE functionality 516, and can, for example, send a number of the SSBs of the second SS burst set 524 that is less than or equal to this number.

The SSBs of the second SS burst set 524 are sent to the SMR 504 on the same base station Tx beam. In other words, when transmitted between the base station 502 and the SMR 504, each of the SSBs of the second SS burst set 524 is quasi-colocated (QCLed) at least spatially with every other SSB of the SSBs of the second SS burst set 524 (e.g., at least QCL type D, but note that QCL types A, B, and/or C (in addition to type D) as among the SSB of the SSBs of the second SS burst set 524 is/are not precluded). This base station Tx beam may be the beam that was used by the SSB of the first SS burst set that was identified back to the base station 502 by the first L1-RSRP feedback 522 of the first phase 508, in the manner described herein (as illustrated by the note "Base Station Tx Beam Trained in Phase I" in FIG. 5B). Accordingly, it will be understood that the SSBs of the second SS burst set 524 are sent from the base station 502 to the SMR 504 on that "best" base station Tx beam for the SMR 504.

The SSBs of the second SS burst set 524 are received at the SMR to base station functionality 514 of the SMR 504. As illustrated, the SMR to base station functionality 514 performs this receiving using the trained SMR Rx beam (as was trained during the first phase 508, as described previously, as illustrated by the note "SMR Rx Beam Trained in Phase 1" in FIG. 5B). Accordingly, it will be understood that the SSBs of the second SS burst set 524 are received at the SMR 504 on the "best" SMR Rx beam relative to transmissions from base station 502.

Once received at the SMR to base station functionality 514 of the SMR 504, the SMR 504 send the first SS burst of the second SS burst set 526 to the UE 506 using the SMR to UE functionality 516. Each of the SSBs of the first SS burst of the second SS burst set 526 may be sent on a separate SMR Tx beam used by the UE Tx RF module of the SMR to UE functionality 516 of the SMR 504 (as illustrated by the note "SMR Tx Beam Sweeping" in FIG. 5B).

The UE 506 may be capable of using up to Z UE Rx beams. Accordingly, SS bursts of the first SS burst set may, in such embodiments, be repeatedly transmitted up to Z times (with the Zth SS burst of the second SS burst set 528 illustrated in FIG. 6B). This repetition allows the UE 506 to receive each SSB of the second SS burst set on an SS burst for each such UE Rx beam.

Then, processing corresponding to each such receipt is performed, such that an SSB of the second SS burst set having a highest signal quality (e.g., as processed on an identified one of the UE Rx beams, in the case that the UE uses Rx beamforming) is identified. This signal quality measure may be, for example, a measure of reference signal received power (RSRP) or a measure of reference signal received quality (RSRQ). When using UE Rx beamforming, the UE 506 may also identify the UE Rx beam upon which this SSB was received with the highest signal quality.

The UE 506 may understand that communications with the base station 502 via the SMR 504 can be accomplished using the route through the SMR 504 that is taken by the identified SSB of the second SS burst set. The UE 506 may accordingly determine to perform subsequent transmissions and/or receptions corresponding to communications with the base station 502 through the SMR 504 according to this route (e.g., according to a system timing that corresponds to the route taken by the particular identified SSB of the second SS burst set, on any UE Rx beam that may have been that was used to receive the identified SSB of the second SS burst set with the highest signal quality (if the UE uses Rx beamforming) in DL, on any UE Tx beam that has a bit-1 beam correspondence with the UE Rx beam so identified and according to that same system timing in UL, etc.)

The UE 506 may provide second L1-RSRP feedback 530 to the SMR 504. The second L1-RSRP feedback 530 is relayed by the SMR 504 to the base station 502. The second L1-RSRP feedback 530 identifies the SSB of the second SS burst set that had the highest signal quality at the UE, determined as previously described. For example, the second L1-RSRP feedback 530 may indicate an RSRP measured quantity value that is based on an absolute L1-RSRP measurement for the SSB of the second SS burst set that had the highest signal quality at the UE, thereby (ultimately) identifying this SSB to the base station 502. Accordingly, the base station 502 is made aware that the best SSB of the second SS burst set for communicating with the UE 506 is the identified SSB of the second SS burst set. Further, the base station 502 may understand that communications with the UE 506 via the SMR 504 are to be accomplished going forward by using the route through the SMR 504 that is taken by the identified SSB of the second SS burst set. The base station 502 may accordingly determine to perform subsequent transmissions and/or receptions corresponding to communications with the UE 506 through the SMR 504 according to this route (according to a system timing that corresponds to the route taken by the identified SSB of the second SS burst set, on the base station Tx beam that was trained in the first phase 508 and that was used for indicating the SSBs of the second SS burst set 524 for DL, on any base station Rx beam that has a bit-1 beam correspondence with the base station Tx beam so identified and according to that same system timing in UL, etc.)

Correspondingly, the SMR 504 may continue to use the trained SMR Rx beam and the SMR Tx beam used for the identified SSB of the second SS burst set for DL communications along this route. Further, an SMR Tx beam with a bit-1 beam correspondence with the trained SMR Rx beam and an SMR Rx beam with a bit-1 beam correspondence with the SMR Tx beam used for the identified SSB of the second SS burst set may be identified and used for UL communications along this route, according to the appropriate system timing established for the route.

It is contemplated that the procedure illustrated in second phase 510 may be repeated periodically, in order to ensure over time that any identified SMR Tx beam and/or any identified UE Rx beam (as identified using the second phase 510) are the "best" beams/beam pair between the SMR 504 and the UE 506. Due to the potentially mobile nature of the UE 506 and/or the potentially relatively high probability of relative antenna panel rotation at the UE 506 during normal use of the UE 506, it may be anticipated that the status of a these beams as a "best" beams/beam pair may shift frequently. Accordingly, a periodicity for performing the second phase 510 may be short (e.g., relative to a periodicity for performing the first phase 508).

After the first phase 508 and the second phase 510 are complete, data communication 532 during the third phase 512 may proceed along the route established through the use of the first phase 508 and the second phase 510 as has been described. The data communication 532 may occur in either and/or both of the DL and UL direction(s). In some embodiments, the data communication 532 comprises user plane data.

In some embodiments, the data communication 532 additionally/alternatively comprises control signaling intended for the SMR 504 that corresponds to the control of the relaying of data between the base station 502 and the UE 506 via the SMR 504. In some cases, this control signaling includes a TDD configuration between the base station 502 and the UE 506.

In some cases, this control signaling includes an indication of one or both of a new SMR Rx beam for the SMR 504 to use to receive transmissions from the base station and/or of a new SMR Tx beam for the SMR 504 to use to send transmissions to the base station. A validity duration for either/both of an indicated new SMR Rx beam and/or indicated SMR Tx beam may also be provided.

In some cases, this control signaling includes an indication of one or both of a new SMR Rx beam for the SMR 504 to use to receive transmissions from the UE and/or of a new SMR Tx beam for the SMR 504 to use to send transmissions to the UE. A validity duration for either/both of an indicated SMR Rx beam and/or indicated SMR Tx beam may also be provided. This type of indication may be relatively frequent (as the base station attempts to schedule the UE, while accounting for UE mobility and/or UE antenna panel rotation).

In some cases, this control signaling includes power state information for the SMR 504. This power state information may control the power state of one or more of RF modules of the SMR 504 (including, e.g., any base station Rx RF module and/or base station Tx RF module of the SMR to base station functionality 514, any UE Tx RF module and/or UE Rx RF module of the SMR to UE functionality 516, and/or any other (unillustrated) RF module of the SMR 504).

The ability to control the power states of RF modules of an SMR may enable a targeted operation of the functions of the SMR, such that it only actively transmits at times where data is actively being relayed through the SMR (and in the manner intended by the system). Enabling only the needed RF modules at only the needed times reduces the total impact of the SMR on spectrum resources by, for example, preventing the SMR from rebroadcasting noise when there is not explicit signaling from either of the base station 502 or the UE 506 to be relayed through the SMR, etc. This behavior may also reduce the overall power use of the SMR.

The RF modules of an SMR may be controlled according to various modes. In a first mode, the entire device may effectively be powered off (e.g., each of the base station Rx RF module, the UE Tx RF module, the base station Tx RF module, and the UE Rx RF module may be powered off).

In a second mode, the power state information may correspond to a TDD configuration between the base station and the UE. This second mode may correspond to/be used attendant to data transmission that occurs after the beam management scheme has been established.

In the second mode, for DL slots/symbols in the TDD configuration, the power state information may configure a base station Rx RF module and a UE Tx RF module to be on, and a base station Tx RF module and a UE Rx RF module to be off. For UL slots/symbols in the TDD configuration, the power state information may configure a base station Tx RF module and a UE Rx RF module to be on, and a base station Rx RF module and a UE Tx RF module to be off. For flexible slots/symbols in the TDD configuration, the power state information may configure each RF module to be on. For unused slots/symbols in the TDD configuration, the power state information may configure each RF module to be off.

It is noted that power state changes to the RF modules may involve the use of a switching time, which may be accounted for by the network when operating under the second mode.

As a further detail for this second mode, the power state information may further enable RF module(s) at a beam level using beam specific information. For example, for DL slots/symbols in the TDD configuration, the power state information may configure a base station Rx RF module to be on and a UE Tx RF module to be on but to only use an intended/indicated Tx beam for its relay transmission at a specific time. This beam indication may be according to, e.g., a TCI state known to the SMR. As another example, for UL slots/symbols in the TDD configuration, the power state information may configure a base station Tx RF module to be on and a UE Rx FR module to be one but to only use an intended/indicated Rx beam to receive a transmission from the UE to relay at a specific time. This beam indication may be according to, e.g., a TCI state known to the SMR.

In some cases involving multiple phases such as were described in relation the flow diagram 500 of FIG. 5A and FIG. 5B, the power state information may use additional modes to enable various RF modules of the SMR on a phase basis, in order to enable data reception and/or data transmission by the SMR during that phase. For example, relative to the flow diagram 500 of FIG. 5A, in a third mode, the power state information configures only the SMF's base station Rx RF module to be on during a period of time for receiving SS bursts (e.g., the first SS burst of the first SS burst set 518 through the Yth SS burst of the first SS burst set 520) from the base station 502. In a fourth mode (again relative to the flow diagram 500 of FIG. 5A and FIG. 5B), the power state information configures only the SMF's base station Tx RF to be on during a period of time for sending the first L1-RSRP feedback 522 from the SMR 504 to the base station 502. Note that as part of the third and fourth modes, the power state information consistently configures the UE Rx RF module and the UE Tx RF module to be off, as these are not used at all during the first phase 508.

It is anticipated that relative to the embodiment of FIG. 5A and FIG. 5B, power state information may be used to configure the SMR 504 according any of the first, second, third, and/or fourth modes, as may be appropriate.

Figure 6A:
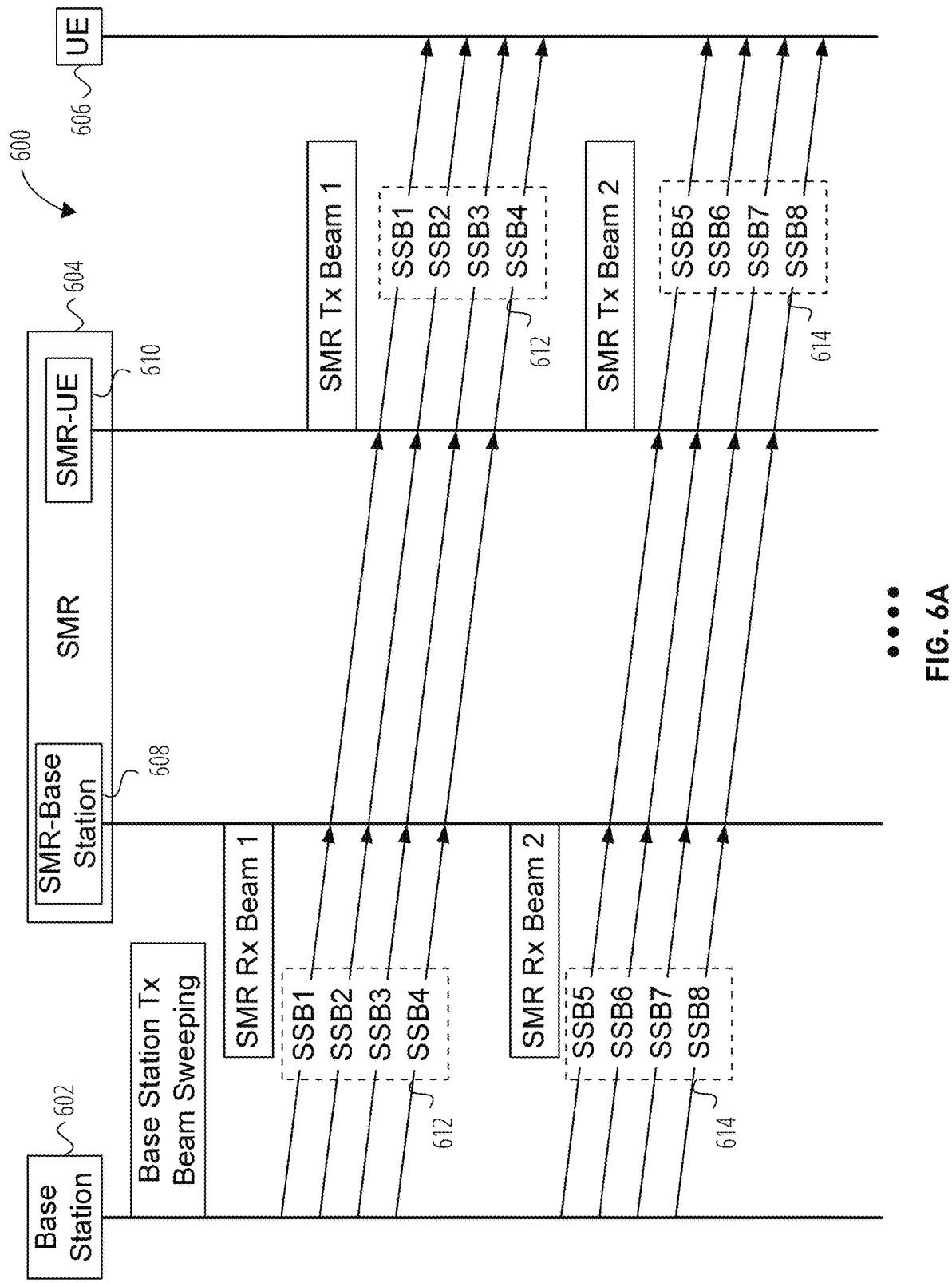
Figure 6B:
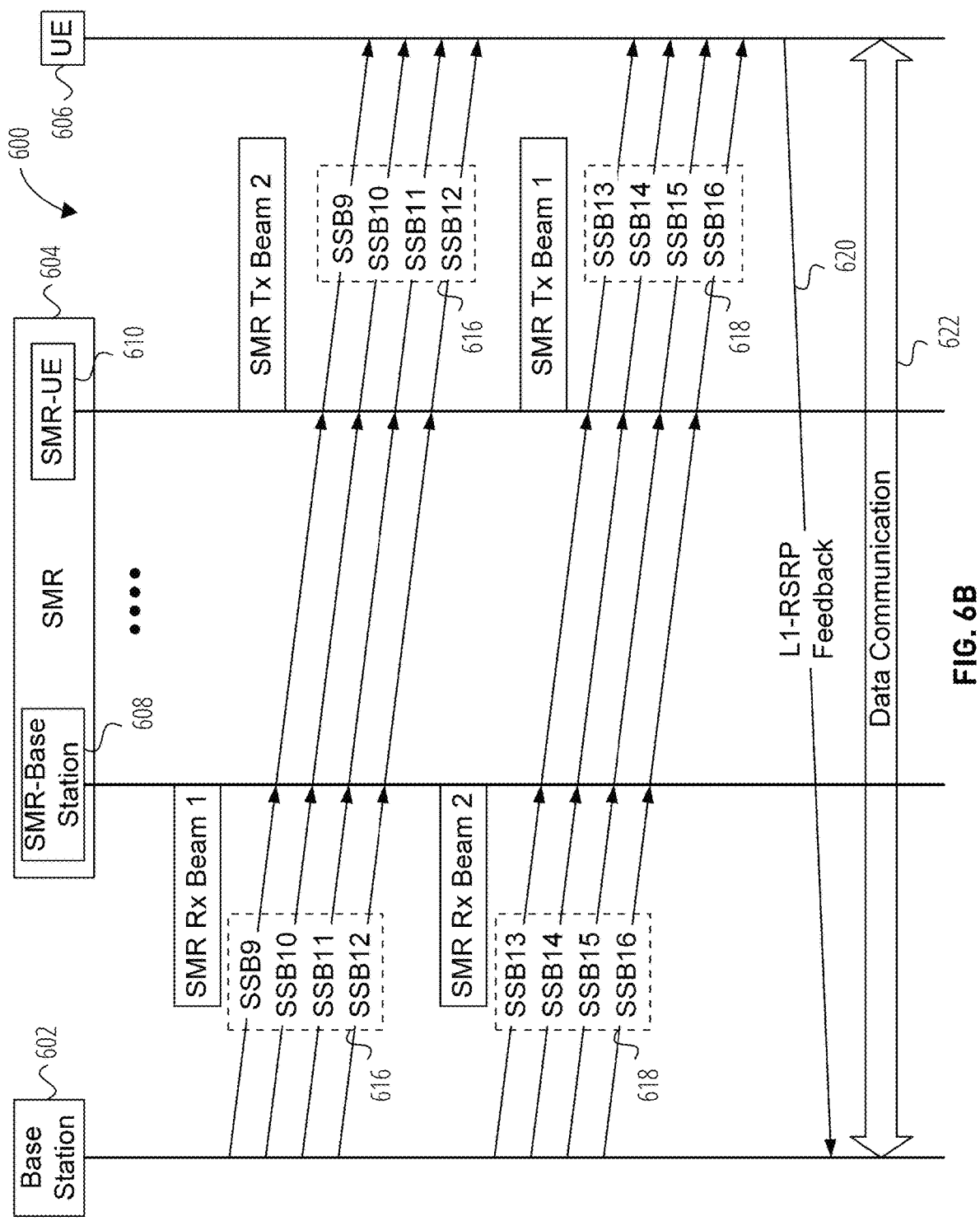

FIG. 6A and FIG. 6B together illustrate a flow diagram 600 for control signaling to beam management between a base station 602, an SMR 604, and a UE 606, according to an embodiment. As can be seen in the flow diagram 600, the SMR 604 send/receives signaling to/from the base station 602 using an SMR to base station functionality 608, and sends/receives signaling to/from the SMR 604 to the UE 606 using an SMR to UE functionality 610. The SMR to base station functionality 608 may be understood to be accomplished via, for example a base station Rx RF module of the SMR 604 and a base station Tx RF module of the SMR 604 (such as the base station Rx RF module 314 and the base station Tx RF module 318 described in relation to FIG. 3). The SMR to UE functionality 610 may be understood to be accomplished via, for example, a UE Tx RF module of the SMR 604 and a UE Rx RF module of the SMR 604 (such as the UE Tx RF module 316 and the UE Rx RF module 320 described in relation to FIG. 3).

In the embodiment of FIG. 6A and FIG. 6B, a control module of the SMR 604 may not comprise/reuse an NR UE modem, and/or in any case may not share Tx/Rx characteristics for a control plane connection between the base station 602 and the SMR 604 (e.g., different to the case illustrated in FIG. 5A and FIG. 5B). In such embodiments, it may be that the SMR 604 accordingly does not perform some of the beam management behaviors previously described in relation to the first phase 508 of the flow diagram 500 of FIG. 5A and FIG. 5B. In such embodiments, it may be that the control module of the SMR 604 is used for receiving SMR control information from the base station 602 and configuring Rx and/or Tx beams according to that control information (e.g., without influencing this process through any feedback from the SMR 604 to the base station 602, such as the first L1-RSRP feedback 522 of the first phase 508 of the flow diagram 500 as illustrated in FIG. 5A).

The embodiment of FIG. 6A and FIG. 6B illustrates a joint beam training performed for beam management. A joint beam training may assume the use of N base station Tx beams, M SMR Rx beams (e.g., used by the base station Rx RF module of the SMR to base station functionality 608), N1 SMR Tx beams (e.g., used by the UE Tx RF module of the SMR to UE functionality 610), and M1 UE Rx beams. In the example of flow diagram 600 of FIG. 6A and FIG. 6B, N=4, M=2, N1=2, and M2=1. It will be understood that the flow diagram 600 is given by way of example, and that, in other embodiments, other values for these parameters may be used in a given case.

As illustrated, the base station 602 sends a first portion 612 of an SS burst (of a corresponding SS burst set) to the SMR 604. This first portion 612 may contain a first plurality of SSBs of the SS burst. In the flow diagram 600, each SSB of the first portion 612 is sent on a separate base station Tx beam used by the base station 602 (e.g., as illustrated by the note "Base Station Tx Beam Sweeping").

The SMR 604 receives (e.g., at the SMR to base station functionality 608) the first portion 612. As part of this receiving, each of the SSBs of the first portion 612 may be received on a first SMR Rx beam that is used by the base station Rx RF module of the SMR to base station functionality 608 of the SMR 604 (e.g., as illustrated by the note "SMR Rx Beam 1").

Once received at the SMR to base station functionality 608 of the SMR 604, the SMR 604 relays the first portion 612 of the SS burst to the UE 606 using the SMR to UE functionality 610. Each of the SSBs of the first portion 612 may be sent on a first SMR Tx beam that is used by the UE Tx RF module of the SMR to base station functionality 608 of the SMR 604 (e.g., as illustrated by the note "SMR Tx Beam 1").

The UE 606 receives the first portion 612. Because M2=1 in this embodiment, the first portion 612 is received without using any particular UE Rx beamforming and/or using only a single Rx beam that is used by the UE in this particular embodiment.

The base station 602 further sends a second portion 614 of the SS burst to the SMR 604. This second portion 614 may contain a second plurality of SSBs of the SS burst. In the flow diagram 600, each SSB of the second portion 614 is sent on a separate base station Tx beam used by the base station 602 (e.g., continuing according to the note "Base Station Tx Beam Sweeping").

It may be that each SSB of the second portion 614 used is QCLed at least spatially with an SSB of the first portion 612 (e.g., at least QCL type D, but note that QCL types A, B, and/or C (in addition to type D) as among the relevant SSB is/are not precluded). In other words, the same set of base station Tx beams that was used to sweep through respective SSBs of the first portion 612 may be used to sweep through respective SSBs of the second portion 614.

The SMR 604 receives (e.g., at the SMR to base station functionality 608) the second portion 614. As part of this receiving, each of the SSBs of the second portion 614 may be received on a second SMR Rx beam that is used by the base station Rx RF module of the SMR to base station functionality 608 of the SMR 604 (e.g., as illustrated by the note "SMR Rx Beam 2").

Once received at the SMR to base station functionality 608 of the SMR 604, the SMR 604 relays the second portion 614 of the SS burst to the UE 606 using the SMR to UE functionality 610. Each of the SSBs of the second portion 614 may be sent on a second SMR Tx beam that is used by the UE Tx RF module of the SMR to base station functionality 608 of the SMR 604 (e.g., as illustrated by the note "SMR Tx Beam 2").

The UE 606 receives the second portion 614 (e.g., without using any UE Rx beamforming and/or using only a single Rx beam, corresponding to M2=1 as described above).

In like manner as described in relation to the first portion 612 and the second portion 614 above, the flow diagram 600 illustrates transmissions and receptions of the third portion 616 and the fourth portion 618. Each of the third portion 616 and the fourth portion 618 may use base station Tx beam sweeping, with SSBs thereof being QCLed with SSBs of the first portion 612/second portion 614 (e.g., the same beams are used for sweeping through the SSBs of the third portion 616 and the fourth portion 618 as were used for sweeping through the first portion 612 and the second portion 614). As illustrated, the third portion 616 is received at the SMR to base station functionality 608 on the first SMR Rx beam that was used for the first portion 612, and the SMR to UE functionality 610 sends the third portion 616 to the UE 606 on the second SMR Tx beam that was used for the second portion 614. Finally, the fourth portion 618 is received at the SMR to base station functionality 608 on the second SMR Rx beam that was used for the second portion 614, and the SMR to UE functionality 610 sends the fourth portion 618 to the UE 606 on the first SMR Tx beam that was used for the first portion 612.

The UE 606 performs processing corresponding to its receipt of each SSB of the SS burst, such that an SSB of the SS burst set having a highest signal quality is identified. This signal quality measure may be, for example, an RSRP or an RSRQ.

Note that FIG. 6A and FIG. 6B have illustrated one example of joint beam training where M2=1 (where the UE does not use Rx beamforming or uses only one UE Rx beam) and one SS burst of the relevant SS burst set is used. In cases (other than that illustrated in FIG. 6A and FIG. 6B) where M2>1, it is contemplated that the UE 606 may test its (multiple) corresponding UE Rx beams using subsequent repetition(s) of the SS burst set. For example, as applied to FIG. 6A and FIG. 6B, it is contemplated that the UE would receive a first SS burst of the SS burst set (SSB1 through SSB16, as illustrated) on a first UE Rx beam and a second SS burst of the SS burst set (that repeats SSB1 through SSB16) on a second UE Rx beam. Each such SS burst would be processed (on its respective Rx beam) to determine the overall SSB having the highest signal quality (on its respective UE Rx beam). In such cases, the UE 606 may accordingly identify its UE Rx beam upon which this SSB was received with the highest signal quality.

The UE 606 may understand that communications with the base station 602 via the SMR 604 can be accomplished using the route through the SMR 604 that is taken by the identified SSB of the SS burst set. The UE 606 may accordingly determine to perform subsequent transmissions and/or receptions corresponding to communications with the base station 602 through the SMR 604 according to this route (e.g., according to a system timing that corresponds to the route taken by the particular identified SSB of the SS burst set). In cases where M2>1, the UE 606 may identify any particular UE Rx beam that received the identified SSB with the highest signal quality as part of this route. Additionally, in such cases, the UE 606 may identify any UE Tx beam that has a bit-1 beam correspondence with this UE Rx beam as part of the route (in the UL direction).

The UE 606 may provide L1-RSRP feedback 620 to the SMR 604. The L1-RSRP feedback 620 is relayed by the SMR 604 to the base station 602. The L1-RSRP feedback 620 identifies the SSB of the SS burst set that had the highest signal quality, determined as previously described. For example, the L1-RSRP feedback 620 may indicate an RSRP measured quantity value that is based on an absolute L1-RSRP measurement for the SSB of the SS burst set that had the highest signal quality, thereby (ultimately) identifying this SSB to the base station 602. Accordingly, the base station 602 is made aware that the best SSB of the SS burst set for communicating with the SMR 604 is the identified SSB. Further, the base station 602 may understand that communications with the UE 606 via the SMR 604 are to be accomplished going forward by using the route through the SMR 604 that is taken by the identified SSB of the SS burst set. The base station 602 may accordingly determine to perform subsequent transmissions and/or receptions corresponding to communications with the UE 606 through the SMR 604 according to this route (e.g., on the base station Tx beam that was used for the identified SSB of the SS burst set and according to a system timing that corresponds to the route taken by the identified SSB of the SS burst set for DL, on any base station Rx beam that has a bit-1 beam correspondence with the base station Tx beam so identified and according to that same system timing in UL, etc.).

Correspondingly, the SMR 604 may continue to use the SMR Rx beam and the SMR Tx beam used for the identified SSB of the SS burst set for DL communications along this route. Further, an SMR Tx beam with a bit-1 beam correspondence with this SMR Rx beam and an SMR Rx beam with a bit-1 beam correspondence with this SMR Tx beam may be identified and used for UL communications along this route, according to the appropriate system timing established for the route.

Accordingly data communication 622 may then proceed along the route established as has been described. The data communication 622 may occur in either and/or both of the DL and UL direction(s). In some embodiments, the data communication 622 comprises user plane data.

In some embodiments, the data communication 622 additionally/alternatively comprises control signaling intended for the SMR 604 that corresponds to the control of to the relaying of data between the base station 602 and the UE 606 via the SMR 604. In some cases, this control signaling includes a TDD configuration between the base station 602 and the UE 606.

In some cases, this control signaling includes an indication of one or both of a new SMR Rx beam for the SMR 604 to use to receive transmissions from the base station and/or of a new SMR Tx beam for the SMR 604 to use to send transmissions to the base station. A validity duration for either/both of an indicated new SMR Rx beam and/or indicated SMR Tx beam may also be provided. This type of indication may be relatively frequent (as the base station attempts to schedule the UE, while accounting of UE mobility and/or UE antenna panel rotation).

In some cases, this control signaling includes an indication of one or both of a new SMR Rx beam for the SMR 604 to use to receive transmissions from the UE and/or of a new SMR Tx beam for the SMR 604 to use to send transmissions to the UE. A validity duration for either/both of an indicated SMR Rx beam and/or indicated SMR Tx beam may also be provided. This type of indication may be relatively frequent (as the base station attempts to schedule the UE, while accounting of UE mobility and/or UE antenna panel rotation).

In some cases, this control signaling includes power state information for the SMR 604. This power state information may control the power state of one or more of RF modules of the SMR 604 (including, e.g., any base station Rx RF module and/or base station Tx RF module of the SMR to base station functionality 608, any UE Tx RF module and/or UE Rx RF module of the SMR to UE functionality 610, and/or any other (unillustrated) RF module of the SMR 604). In other words, the power state information for the SMR 604 may control the operation of one or more of a base station Rx RF module of the SMR 604, a UE Tx RF module of the SMR 604, a base station Tx RF module of the SMR 604, and a UE Rx RF module of the SMR 604.

As previously described, the ability to control the power states of RF modules of an SMR may enable a targeted operation of the functions of the SMR, such that it only actively transmits at times where data is actively being relayed through the SMR (and only in the manner intended by the system). It is anticipated that relative to the embodiment of FIG. 6A and FIG. 6B, power state information may be used to configure the SMR 604 according to at least the first and/or second modes previously described, as may be appropriate.

It will be understood that the embodiment illustrated by the flow diagram 600 of FIG. 6A could be changed in various ways and still accomplish the result of the UE 606 being enabled to identify a "best" SSB from among the SS burst set.

For example, it may be that, to sufficiently use the N=4 base station Tx beams for beam management purposes when M=2, the base station 602 instead sends a first pair of SSBs (e.g., SSB1 and SSB2) of an SS burst of the SS burst set on a first of the four base station Tx beams, then sends a second pair of SSBs (e.g., SSB3 and SSB4) of the SS burst on a second of the four base station Tx beams, then sends a third pair of SSBs (e.g., SSB5 and SSB6) on a third of the four base station Tx beams, and finally sends a fourth pair of SSB s (e.g., SSB7 and SSB8) on a fourth of the four base station Tx beams. In such a case, it may accordingly be understood that each such pair of SSB is QCLed at least spatially (e.g., at least QCL type D, but note that QCL types A, B, and/or C (in addition to type D) as among the relevant SSB is/are not precluded). This pairwise SSB QCL arrangement could then be repeated on SSB9 through SSB16, with SSB9 and SSB10 QCLed with SSB1 and SSB2, SSB11 and SSB 12 QCLed with SSB3 and SSB4, etc.

Further, the SMR 604 may receive (e.g., at the SMR to base station functionality 608) the first pair of SSBs respectively using a beam sweep through the M=2 SMR Rx beams of the base station Rx RF module of the SMR to base station functionality 608 previously described. This may be repeated seven more times (such that each pair of SSBs as received is swept through in this way).

Finally, the SMR 604 may then proceed to send the SSBs using the SMR Tx beam pattern that is illustrated in FIG. 6A and FIG. 6B.

Accordingly, it will be understood in light of this alternative example that each potential route (e.g., each potential set of base station Tx beam, SMR Rx beam at the base station Rx RF module of the SMR to base station functionality 608, and SMR Tx beam at the base station Tx RF module of the SMR to UE functionality 610) is represented by one of the SSBs of the SS burst set (though the route represented be an SSB of a given index may be different in this case from the prior case described, due to the different procedural ordering of beam usage). Because each possible route is represented, the UE 606 remains capable of receiving and processing each SSB (e.g., including at each Rx beam of the UE 606, if the UE 606 is capable of Rx beamforming) in the manner described, and identifying the "best" SSB back to the base station 602 using L1-RSRP feedback, in the manner described herein, such that the "best" route for data communication between the base station 602 and the UE 606 is determinable in the manner described herein. It is noted that other possible alternative examples could be formulated.

The principles discussed above have been related in terms of the flow diagram 600 of FIG. 6A and FIG. 6B, where N=4, M=2, N1=2, and M2=1 (except where discussed otherwise). It will be apparent that these methodologies may be applied analogously in cases where one or more values for N, M, N1, and/or N2 is selected instead (e.g., may be extended or shrunk at each of the base station 502, the SMR to base station functionality 514, the SMR to UE functionality 516, and/or the UE 506 as necessary to create a full joint beam training, depending on the number of beams used at each such entity).

It is contemplated that a method analogous to those described in relation to the SMR 604 of FIG. 6A and FIG. 6B could feasibly be implemented in an alternative case where an SMR is replaced by an RIS, in view of the recognition that such methods do not require feedback from a control module of the SMR to the base station (see, e.g., FIG. 6A and FIG. 6B).

Further, as is also described elsewhere herein, one consideration for cases where an RIS is used in place of/instead of an SMR is that because an RIS establishes its effective beamformings according to a single currently implemented N×N response matrix (denoted Q) at the RIS (where N is the number of RIS elements), as opposed to through the use multiple RF modules (such as may be available at an SMR), there may be no ability to use different beamformings for Rx as opposed to Tx at the RIS at the same time (e.g., the RIS will inherently have full correspondence in the Rx and Tx usage cases at each of its effective beams at any one point in time). Accordingly, a system using an RIS may perform joint optimization of a base station beamforming weight $W_s$, a UE receiving weight $W_r$, and the RIS response matrix Q (in light of the physical channel between the base station and the RIS $H_{dr}$ and the physical channel between the RIS and the UE $H_{rs}$) in order to achieve an effective channel Y corresponding to the effective beamforming behavior at the RIS that is desired, where:

$$Y = W_r H_{dr} Q H_{rs} W_s.$$

In cases like those described in relation to FIG. 6A and FIG. 6B, and where an RIS is used rather than an SMR is used, and in view of the principles described above, it is contemplated the base station may configure the timing(s) for the application of one or more response matrices Q to the RIS to the RIS controller, as part of ensuring that the desired effective RIS Tx beam response and effective RIS Rx beam response for each SSB of the SS burst set is present at the RIS at the time of that SSB. This may be performed in the form of a sweep through a codebook for the RIS that defines various response matrices Q (e.g., such that each applied matrix Q corresponds to the desired Rx and Tx SMR beam behavior for a corresponding SSB). Then, once the "best" route is accordingly identified to the base station by L1-RSRP feedback from the UE, the base station may proceed to configure the RIS to apply the response matrix Q that corresponds to that "best" route through the RIS preparatory to further data communication.

Figure 7:
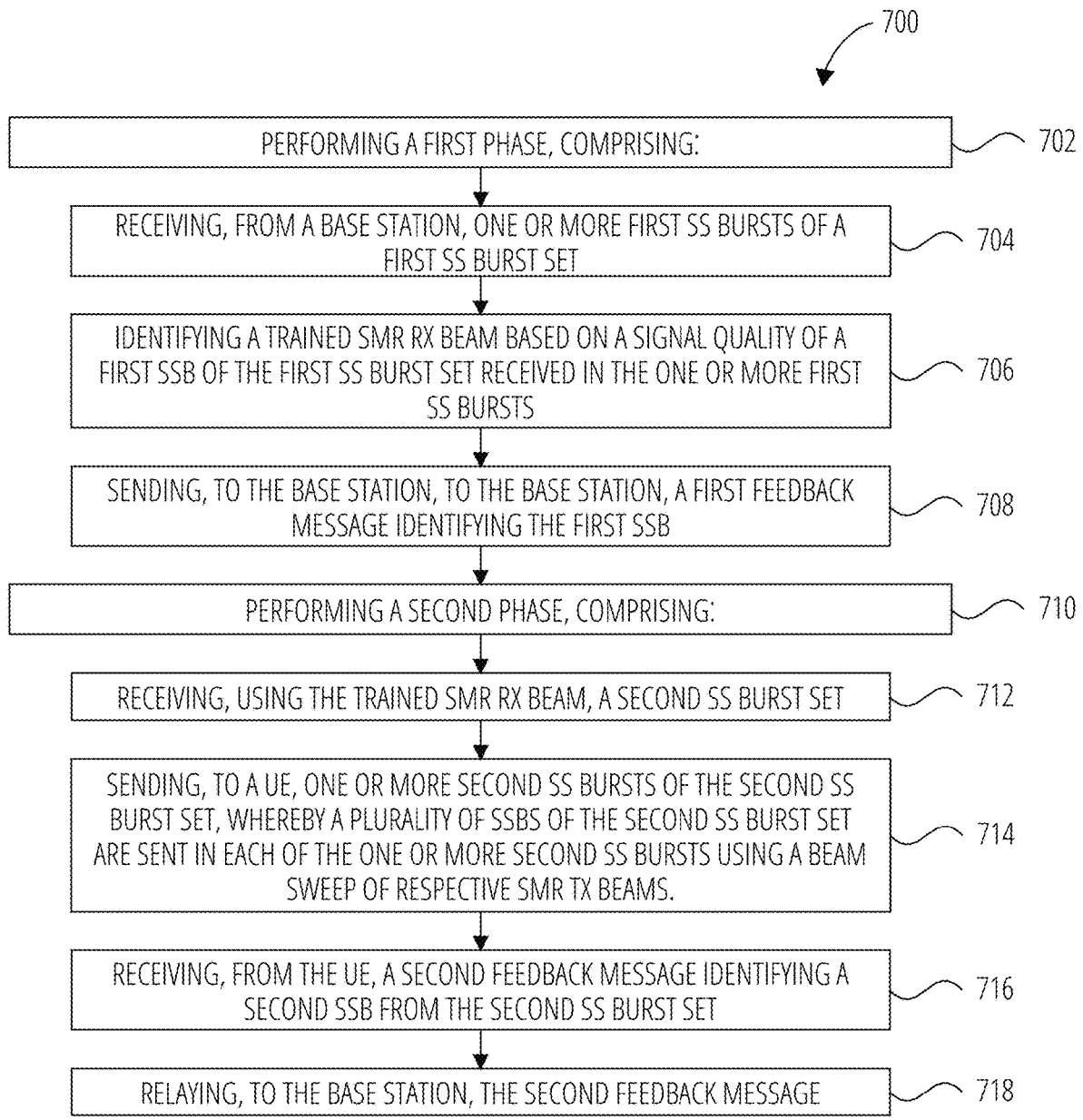
FIG. 7 illustrates a method of an SMR, according to an embodiment.

FIG. 7 illustrates a method 700 of an SMR, according to an embodiment. The method 700 includes performing 702 a first phase.

The first phase of the method 700 includes receiving 704, from a base station, one or more first SS bursts of a first SS burst set.

The first phase of the method 700 further includes identifying 706 a trained SMR Rx beam based on a signal quality of a first SSB of the first SS burst set received in the one or more first SS bursts.

The first phase of the method 700 further includes sending 708, to the base station, a first feedback message identifying the first SSB.

The method 700 further includes performing 710 a second phase.

The second phase of the method 700 includes receiving 712, using the trained SMR Rx beam, a second SS burst set.

The second phase of the method 700 further includes sending 714, to a UE, one or more second SS bursts of the second SS burst set, whereby a plurality of SSBs of the second SS burst set are sent in each of the one or more second SS bursts using a beam sweep of respective SMR Tx beams.

The second phase of the method 700 further includes receiving 716, from the UE, a second feedback message identifying a second SSB from the second SS burst set.

The second phase of the method 700 further includes relaying 718, to the base station, the second feedback message.

In some embodiments of the method 700, the first phase is performed according to a first periodicity, and the second phase is performed according to a second periodicity that is shorter than the first periodicity.

In some embodiments of the method 700, identifying the trained SMR Rx beam based on the signal quality of the first SSB comprises: identifying the first SSB as received with a highest signal quality of all SSBs received in the one or more first SS bursts; and identifying that the first SSB was received with the highest signal quality on the trained SMR Rx beam.

In some embodiments, the method 700 further includes performing a third phase, comprising receiving user plane data for the UE from the base station on the trained SMR Rx beam; and sending the user plane data to the UE on an SMR Tx beam corresponding to the second SSB.

In some embodiments, the method 700 further includes receiving, from the base station, control signaling corresponding to data relaying between the base station and the UE via the SMR. In some of these embodiments, the control signaling includes a TDD configuration between the base station and the UE. In some of these embodiments, the control signaling includes an indication of one of a new SMR Rx beam to use to receive transmissions from the base station and of a new SMR Tx beam to use to send transmissions to the base station; and a validity duration for the one of the new SMR Rx beam and the new SMR Tx beam. In some of these embodiments, the control signaling includes an indication of one of a new SMR Rx beam to use to receive transmissions from the UE and of a new SMR Tx beam to use to send transmissions to the UE; and a validity duration for the one of the new SMR Rx beam and the new SMR Tx beam.

In some of these embodiments, the control signaling comprises power state information for the SMR. In some such embodiments, the power state information corresponds to a TDD configuration between the base station and the UE. In some such embodiments, the power state information enables data reception at the SMR from the base station during the first phase. In some such embodiments, the power state information enables data transmission from the SMR to the base station during the first phase.

In some embodiments, the method 700 further includes sending, to the base station, a message containing SMR codebook information that controls a number of the plurality of SSBs of the second SS burst set.

Embodiments contemplated herein include an apparatus comprising means to perform one or more elements of the method 700. This apparatus may be, for example, an apparatus of an SMR (such as the SMR 1102, as described herein).

Embodiments contemplated herein include one or more non-transitory computer-readable media comprising instructions to cause an electronic device, upon execution of the instructions by one or more processors of the electronic device, to perform one or more elements of the method 700. This non-transitory computer-readable media may be, for example, a memory of a an SMR (such as a memory 1106 of the SMR 1102, as described herein).

Embodiments contemplated herein include an apparatus comprising logic, modules, or circuitry to perform one or more elements of the method 700. This apparatus may be, for example, an apparatus of a UE (such as the SMR 1102, as described herein).

Embodiments contemplated herein include an apparatus comprising: one or more processors and one or more computer-readable media comprising instructions that, when executed by the one or more processors, cause the one or more processors to perform one or more elements of the method 700. This apparatus may be, for example, an apparatus of an SMR such as the SMR 1102, as described herein).

Embodiments contemplated herein include a signal as described in or related to one or more elements of the method 700.

Embodiments contemplated herein include a computer program or computer program product comprising instructions, wherein execution of the program by a processor is to cause the processor to carry out one or more elements of the method 700. The processor may be a processor of an SMR (such as processor(s) 1104 of the SMR 1102, as described herein). These instructions may be, for example, located in the processor and/or on a memory of the SMR (such as a processor(s) 1104 or the memory 1106 of the SMR 1102, as described herein).

Figure 8:
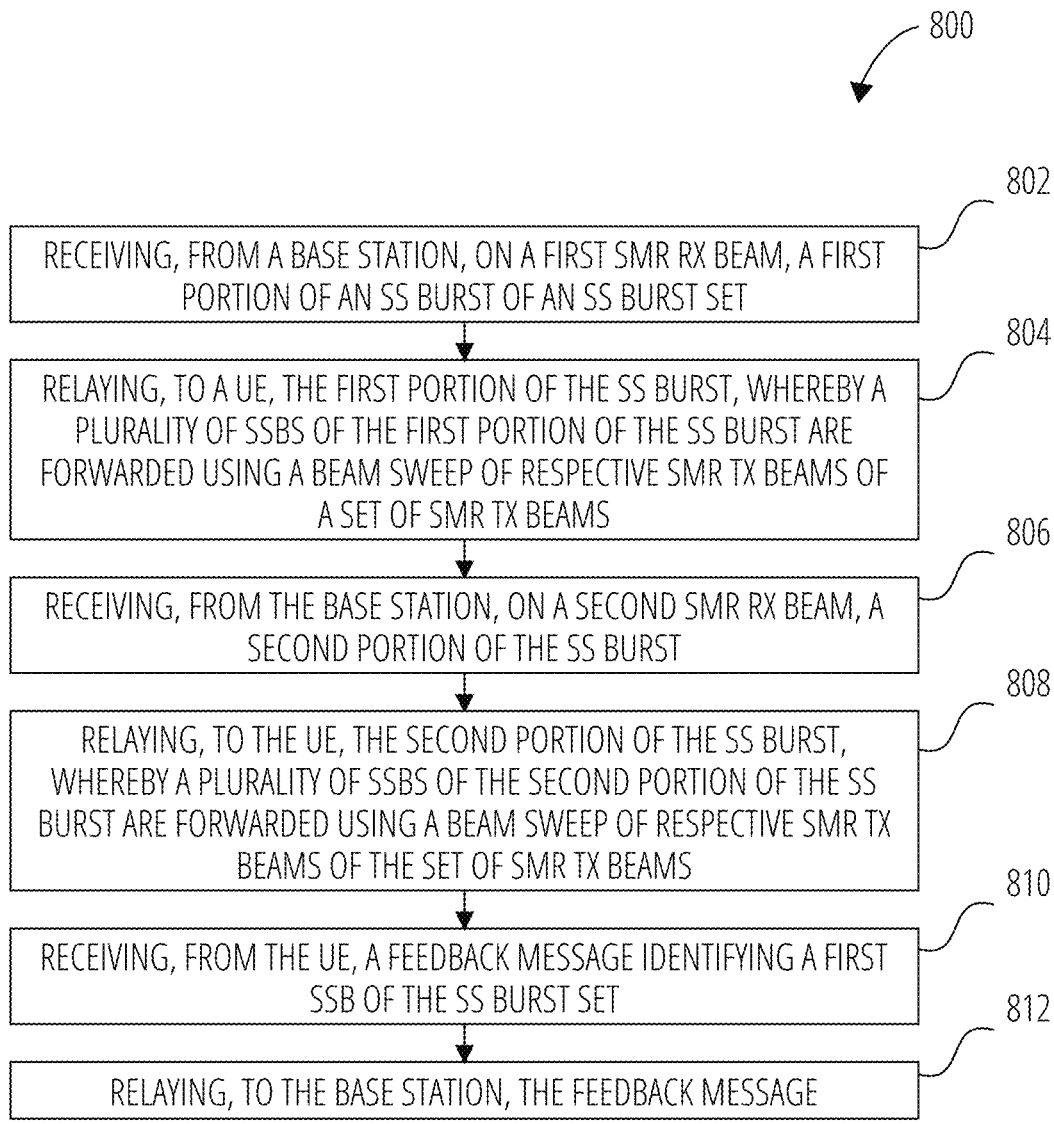
FIG. 8 illustrates a method of an SMR, according to an embodiment.

FIG. 8 illustrates a method 800 of an SMR, according to an embodiment. The method 800 includes receiving 802, from a base station, on a first SMR Rx beam, a first portion of an SS burst of an SS burst set.

The method 800 further includes relaying 804, to a UE, the first portion of the SS burst, whereby a plurality of SSBs of the first portion of the SS burst are forwarded using a beam sweep of respective SMR Tx beams of a set of SMR Tx beams.

The method 800 further includes receiving 806, from the base station, on a second SMR Rx beam, a second portion of the SS burst.

The method 800 further includes relaying 808, to the UE, the second portion of the SS burst, whereby a plurality of SSBs of the second portion of the SS burst are forwarded using a beam sweep of respective SMR Tx beams of the set of SMR Tx beams.

The method 800 further includes receiving 810, from the UE, a feedback message identifying a first SSB of the SS burst set.

The method 800 further includes relaying 812, to the base station, the feedback message.

In some embodiments of the method 800, the plurality of SSBs of the first portion of the SS burst occupy respective ones of a set of base station Tx beams; and the plurality of SSBs of the second portion of the SS burst occupy respective ones of the set of base station Tx beams.

In some embodiments of the method 800, two or more of the plurality of SSBs of the first portion of the SS burst occupy a first base station Tx beam; and two or more the plurality of SSBs of the second portion of the SS burst occupy a second base station Tx beam.

In some embodiments, the method 800 further includes receiving, from the base station, control signaling corresponding to data relaying between the base station and the UE via the SMR. In some of these embodiments, the control signaling includes a TDD configuration between the base station and the UE. In some of these embodiments, the control signaling includes an indication of one or more of a new SMR Rx beam to use to receive transmissions from the base station and of a new SMR Tx beam to use to send transmissions to the base station; and a validity duration for the one or more of the new SMR Rx beam and the new SMR Tx beam. In some of these embodiments, the control signaling includes an indication of one or more of a new SMR Rx beam to use to receive transmissions from the UE and of a new SMR Tx beam to use to send transmissions to the UE; and a validity duration for the one or more of the new SMR Rx beam and the new SMR Tx beam. In some of these embodiments, the control signaling includes power state information for the SMR that corresponds to a TDD configuration between the base station and the UE.

Embodiments contemplated herein include an apparatus comprising means to perform one or more elements of the method 800. This apparatus may be, for example, an apparatus of an SMR (such as the SMR 1102, as described herein).

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, a memory of a an SMR (such as a memory 1106 of the SMR 1102, as described herein).

Embodiments contemplated herein include an apparatus comprising logic, modules, or circuitry to perform one or more elements of the method 800. This apparatus may be, for example, an apparatus of a UE (such as the SMR 1102, as described herein).

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of an SMR such as the SMR 1102, as described herein).

Embodiments contemplated herein include a signal as described in or related to one or more elements of the method 800.

Embodiments contemplated herein include a computer program or computer program product comprising instructions, wherein execution of the program by a processor is to cause the processor to carry out one or more elements of the method 800. The processor may be a processor of an SMR (such as processor(s) 1104 of the SMR 1102, as described herein). These instructions may be, for example, located in the processor and/or on a memory of the SMR (such as a processor(s) 1104 or the memory 1106 of the SMR 1102, as described herein).

Figure 9:
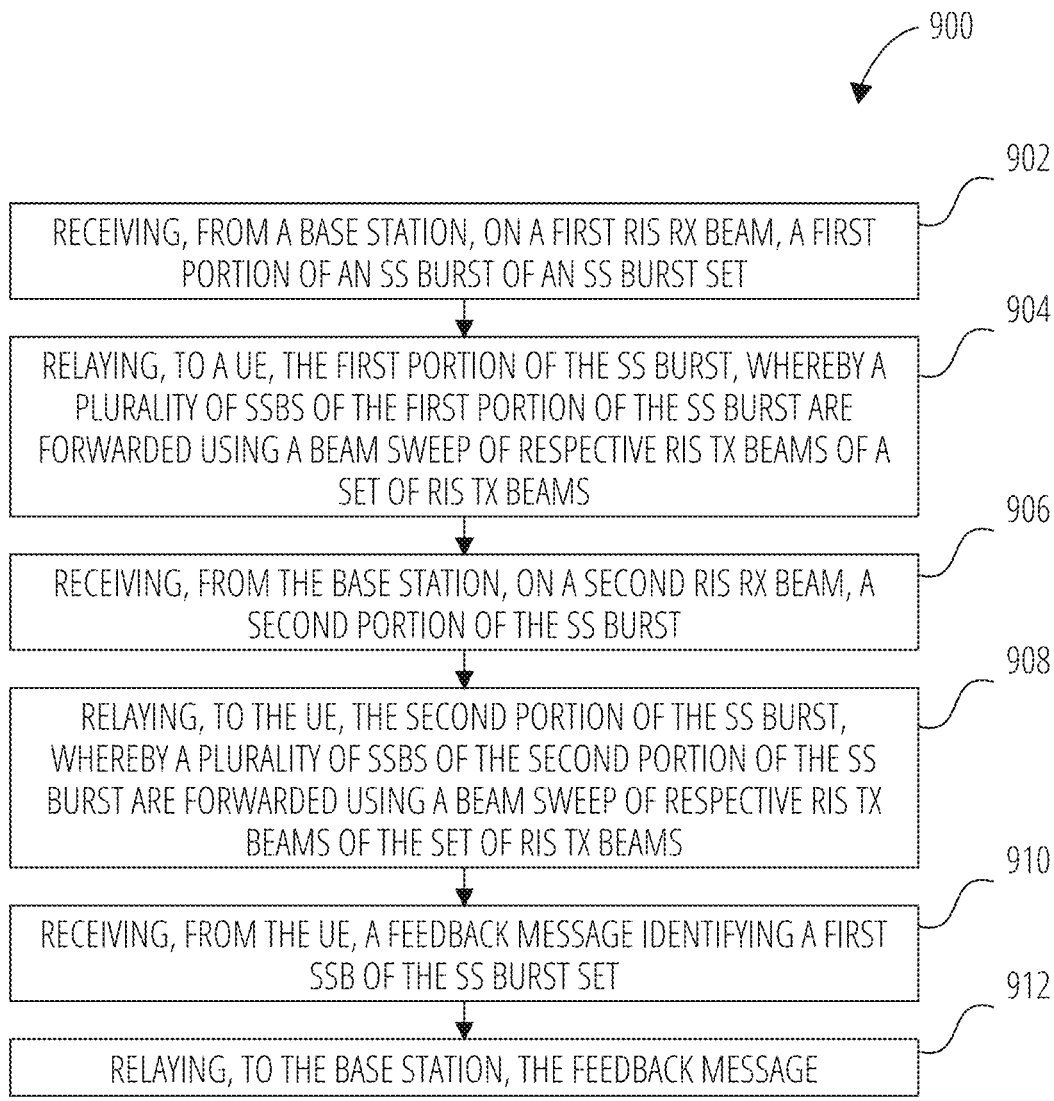
FIG. 9 illustrates a method of an RIS, according to an embodiment.

FIG. 9 illustrates a method 900 of an SMR, according to an embodiment. The method 900 includes receiving 902, from a base station, on a first RIS Rx beam, a first portion of an SS burst of an SS burst set.

The method 900 further includes relaying 904, to a UE, the first portion of the SS burst, whereby a plurality of SSBs of the first portion of the SS burst are forwarded using a beam sweep of respective RIS Tx beams of a set of RIS Tx beams.

The method 900 further includes receiving 906, from the base station, on a second RIS Rx beam, a second portion of the SS burst.

The method 900 further includes relaying 908, to the UE, the second portion of the SS burst, whereby a plurality of SSBs of the second portion of the SS burst are forwarded using a beam sweep of respective RIS Tx beams of the set of RIS Tx beams.

The method 900 further includes receiving 910, from the UE, a feedback message identifying a first SSB of the SS burst set.

The method 900 further includes relaying 912, to the base station, the feedback message.

In some embodiments of the method 900, the plurality of SSBs of the first portion of the SS burst occupy respective ones of a set of base station Tx beams; and the plurality of SSBs of the second portion of the SS burst occupy respective ones of the set of base station Tx beams.

In some embodiments of the method 900, two or more of the plurality of SSBs of the first portion of the SS burst occupy a first base station Tx beam; and two or more of the plurality of SSBs of the second portion of the SS burst occupy a second base station Tx beam.

In some embodiments, the method 900 further includes receiving control signaling comprising an RIS response matrix configuring the RIS to use the set of RIS Tx beams, the first RIS Rx beam, and the second RIS Rx beam; and applying the RIS response matrix from the control signaling at the RIS.

Embodiments contemplated herein include an apparatus comprising means to perform one or more elements of the method 900. This apparatus may be, for example, an apparatus of an RIS (such as the RIS 1202, as described herein).

Embodiments contemplated herein include one or more non-transitory computer-readable media comprising instructions to cause an electronic device, upon execution of the instructions by one or more processors of the electronic device, to perform one or more elements of the method 900. This non-transitory computer-readable media may be, for example, a memory of an RIS (such as a memory 1206 of the RIS 1202, as described herein).

Embodiments contemplated herein include an apparatus comprising logic, modules, or circuitry to perform one or more elements of the method 900. This apparatus may be, for example, an apparatus of a RIS (such as the RIS 1202 as described herein).

Embodiments contemplated herein include an apparatus comprising: one or more processors and one or more computer-readable media comprising instructions that, when executed by the one or more processors, cause the one or more processors to perform one or more elements of the method 900. This apparatus may be, for example, an apparatus of an RIS such as the RIS 1202, as described herein).

Embodiments contemplated herein include a signal as described in or related to one or more elements of the method 900.

Embodiments contemplated herein include a computer program or computer program product comprising instructions, wherein execution of the program by a processor is to cause the processor to carry out one or more elements of the method 900. The processor may be a processor of an RIS (such as processor(s) 1204 of the RIS 1202, as described herein). These instructions may be, for example, located in the processor and/or on a memory of the RIS (such as the processor(s) 1204 or the memory 1206 of the RIS 1202, as described herein).

Figure 10:
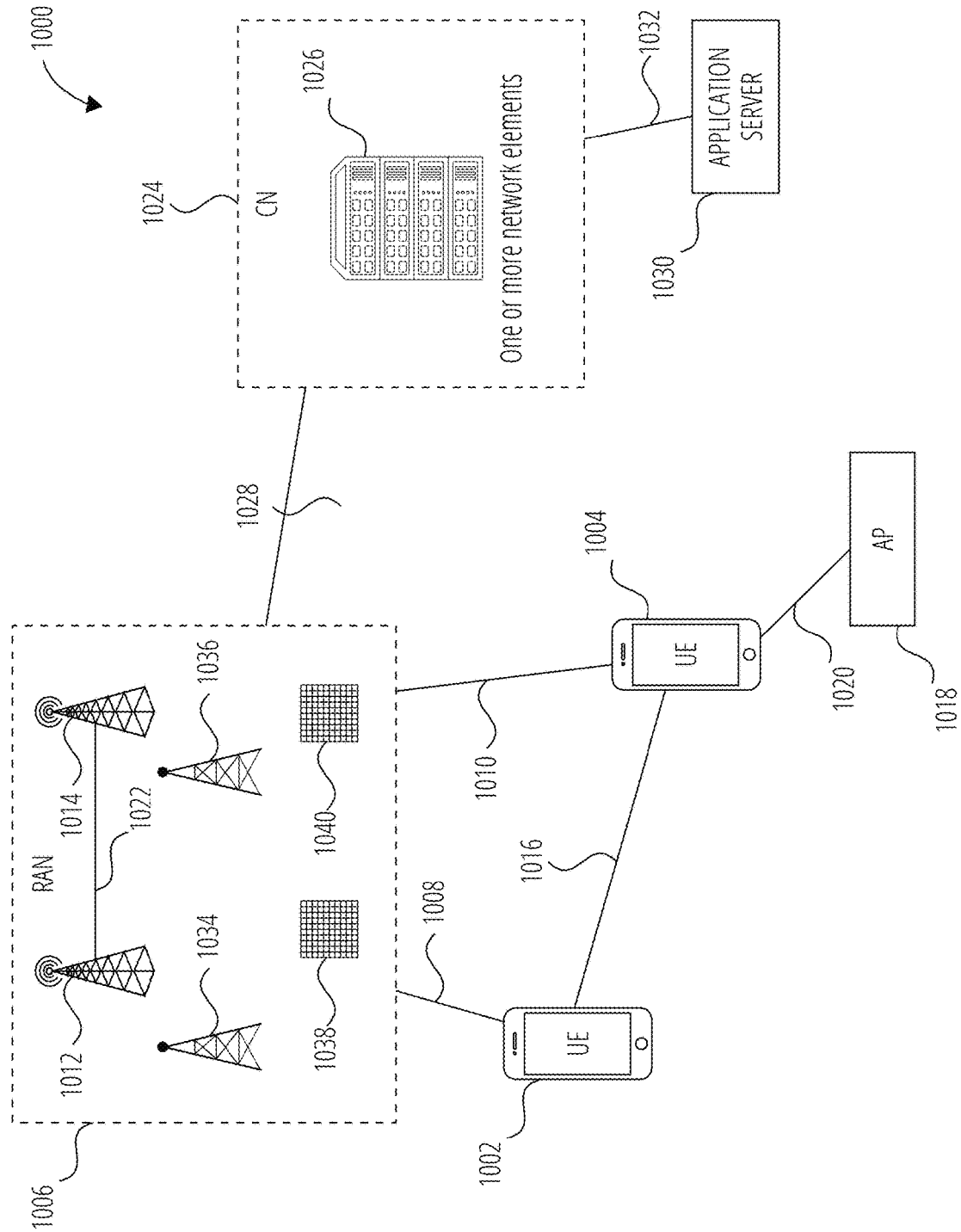
FIG. 10 illustrates an example architecture of a wireless communication system, according to embodiments disclosed herein.

FIG. 10 illustrates an example architecture of a wireless communication system 1000, according to embodiments disclosed herein. The following description is provided for an example wireless communication system 1000 that operates in conjunction with the LTE system standards and/or 5G or NR system standards as provided by 3GPP technical specifications.

As shown by FIG. 10, the wireless communication system 1000 includes UE 1002 and UE 1004 (although any number of UEs may be used). In this example, the UE 1002 and the UE 1004 are illustrated as smartphones (e.g., handheld touchscreen mobile computing devices connectable to one or more cellular networks), but may also comprise any mobile or non-mobile computing device configured for wireless communication.

The UE 1002 and UE 1004 may be configured to communicatively couple with a RAN 1006. In embodiments, the RAN 1006 may be NG-RAN, E-UTRAN, etc. The UE 1002 and UE 1004 utilize connections (or channels) (shown as connection 1008 and connection 1010, respectively) with the RAN 1006, each of which comprises a physical communications interface. The RAN 1006 can include one or more base stations, such as base station 1012 and base station 1014, one or more SMRs, such as the SMR 1034 and the SMR 1036, and/or one or more RISs, such as the RIS 1038 and the RIS 1040, any of which can that enable the connection 1008 and connection 1010 (with the SMRs and/or RISs being controlled by the base stations, in the manner described herein).

In this example, the connection 1008 and connection 1010 are air interfaces to enable such communicative coupling, and may be consistent with RAT(s) used by the RAN 1006, such as, for example, an LTE and/or NR.

In some embodiments, the UE 1002 and UE 1004 may also directly exchange communication data via a sidelink interface 1016. The UE 1004 is shown to be configured to access an access point (shown as AP 1018) via connection 1020. By way of example, the connection 1020 can comprise a local wireless connection, such as a connection consistent with any IEEE 802.11 protocol, wherein the AP 1018 may comprise a Wi-Fi® router. In this example, the AP 1018 may be connected to another network (for example, the Internet) without going through a CN 1024.

In embodiments, the UE 1002 and UE 1004 can be configured to communicate using orthogonal frequency division multiplexing (OFDM) communication signals with each other or with the base station 1012, the base station 1014, the SMR 1034, the SMR 1036, the RIS 1038, and/or the RIS 1040 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1012 or base station 1014 may be implemented as one or more software entities running on server computers as part of a virtual network. In addition, or in other embodiments, the base station 1012 or base station 1014 may be configured to communicate with one another via interface 1022. In embodiments where the wireless communication system 1000 is an LTE system (e.g., when the CN 1024 is an EPC), the interface 1022 may be an X2 interface. The X2 interface may be defined between two or more base stations (e.g., two or more eNBs and the like) that connect to an EPC, and/or between two eNBs connecting to the EPC. In embodiments where the wireless communication system 1000 is an NR system (e.g., when CN 1024 is a 5GC), the interface 1022 may be an Xn interface. The Xn interface is defined between two or more base stations (e.g., two or more gNBs and the like) that connect to 5GC, between a base station 1012 (e.g., a gNB) connecting to 5GC and an eNB, and/or between two eNBs connecting to 5GC (e.g., CN 1024).

The RAN 1006 is shown to be communicatively coupled to the CN 1024. The CN 1024 may comprise one or more network elements 1026, which are configured to offer various data and telecommunications services to customers/subscribers (e.g., users of UE 1002 and UE 1004) who are connected to the CN 1024 via the RAN 1006. The components of the CN 1024 may be implemented in one physical device or separate physical devices including components to read and execute instructions from a machine-readable or computer-readable medium (e.g., a non-transitory machine-readable storage medium).

In embodiments, the CN 1024 may be an EPC, and the RAN 1006 may be connected with the CN 1024 via an S1 interface 1028. In embodiments, the S1 interface 1028 may be split into two parts, an S1 user plane (S1-U) interface, which carries traffic data between the base station 1012 or base station 1014 and a serving gateway (S-GW), and the S1-MME interface, which is a signaling interface between the base station 1012 or base station 1014 and mobility management entities (MMEs).

In embodiments, the CN 1024 may be a 5GC, and the RAN 1006 may be connected with the CN 1024 via an NG interface 1028. In embodiments, the NG interface 1028 may be split into two parts, an NG user plane (NG-U) interface, which carries traffic data between the base station 1012 or base station 1014 and a user plane function (UPF), and the S1 control plane (NG-C) interface, which is a signaling interface between the base station 1012 or base station 1014 and access and mobility management functions (AMFs).

Generally, an application server 1030 may be an element offering applications that use internet protocol (IP) bearer resources with the CN 1024 (e.g., packet switched data services). The application server 1030 can also be configured to support one or more communication services (e.g., VoIP sessions, group communication sessions, etc.) for the UE 1002 and UE 1004 via the CN 1024. The application server 1030 may communicate with the CN 1024 through an IP communications interface 1032.

Figure 11A:
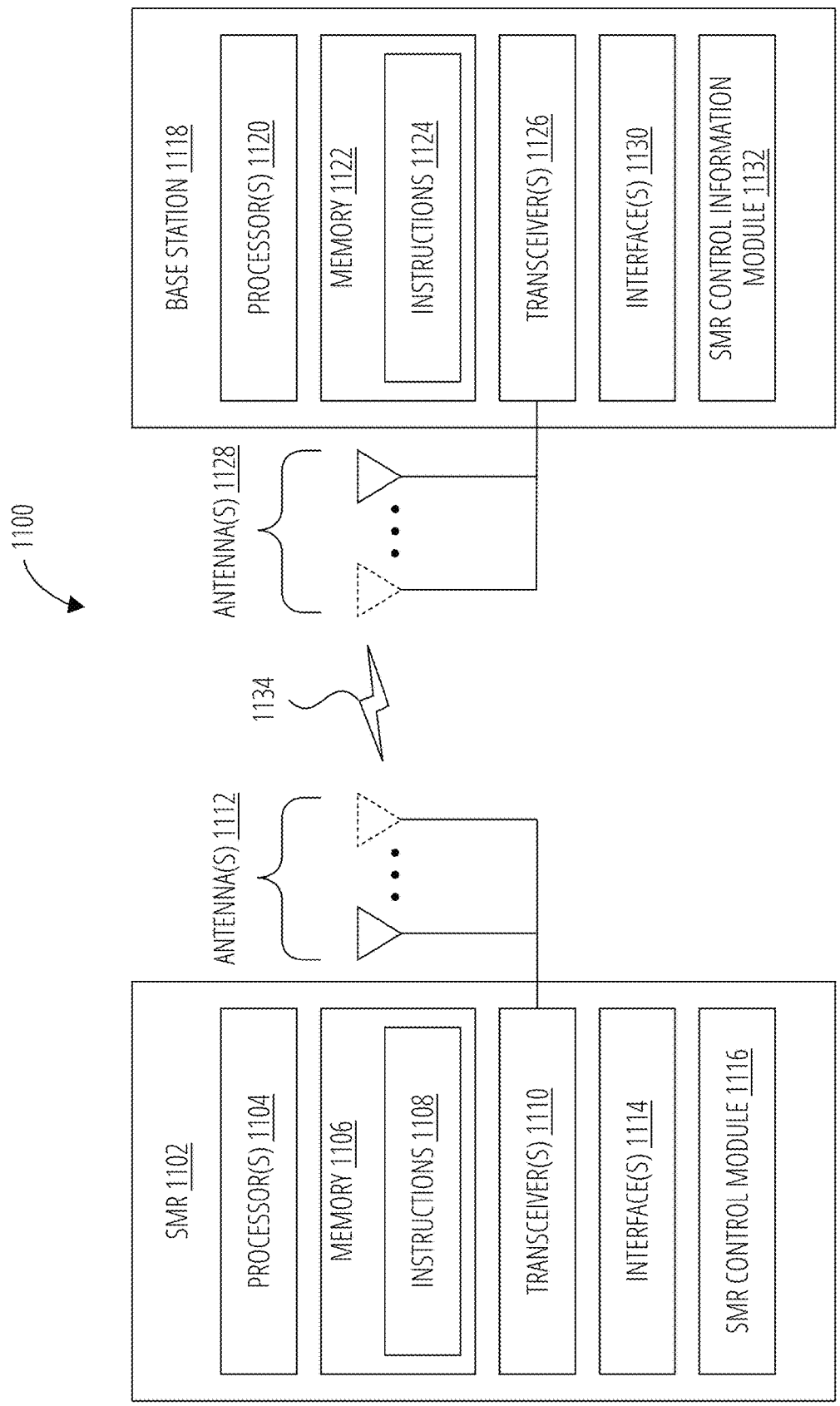
FIG. 11A and FIG. 11B together illustrate a system for performing signaling between an SMR, a base station, and a UE, according to an embodiment.
Figure 11B:
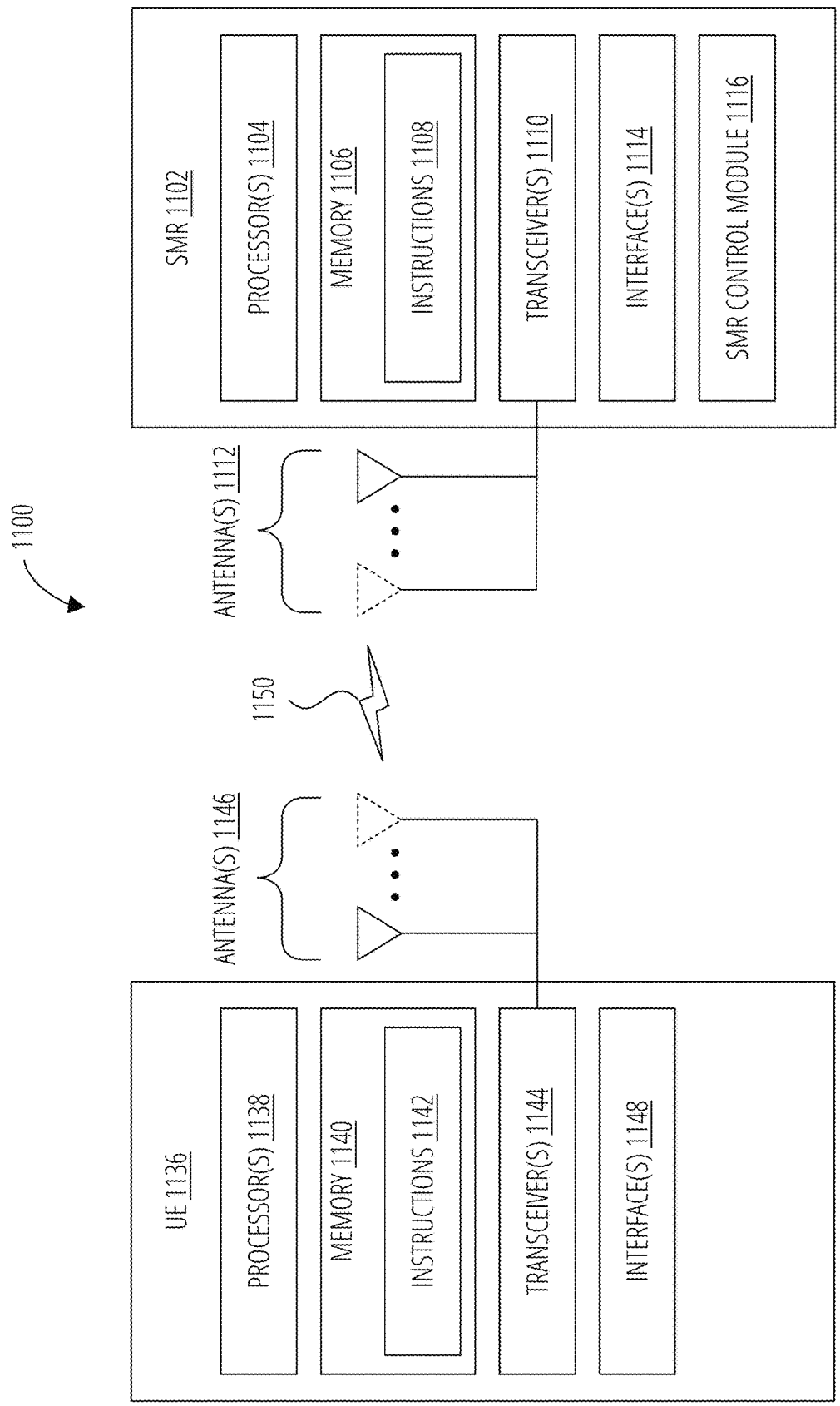

FIG. 11A and FIG. 11B together illustrate a system 1100 for performing signaling between an SMR 1102, a base station 1118, and a UE 1136, according to an embodiment. FIG. 11A illustrates the SMR 1102 and the base station 1118, and FIG. 11B illustrates the SMR 1102 and the UE 1136. The system 1100 may be a portion of a wireless communications system as herein described. The base station 1118 may be, for example, a gNB or an eNB of a wireless communication system. The UE 1136 may be, for example, a UE of a wireless communication system as contemplated herein.

As illustrated in FIG. 11A, the SMR 1102 may include one or more processor(s) 1104. The processor(s) 1104 may execute instructions such that various operations of the SMR 1102 are performed, as described herein. The processor(s) 1104 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The SMR 1102 may include a memory 1106. The memory 1106 may be a non-transitory computer-readable storage medium that stores instructions 1108 (which may include, for example, the instructions being executed by the processor(s) 1104). The instructions 1108 may also be referred to as program code or a computer program. The memory 1106 may also store data used by, and results computed by, the processor(s) 1104.

The SMR 1102 may include one or more transceiver(s) 1110 that may include radio frequency (RF) transmitter and/or receiver circuitry that use the antenna(s) 1112 of the SMR 1102 to facilitate signaling (e.g., the signaling 1134) to and/or from the SMR 1102 with other devices (e.g., the base station 1118) according to corresponding RATs.

The SMR 1102 may include one or more antenna(s) 1112 (e.g., one, two, four, or more). For embodiments with multiple antenna(s) 1112, the SMR 1102 may leverage the spatial diversity of such multiple antenna(s) 1112 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the SMR 1102 may be accomplished according to precoding (or digital beamforming) that is applied at the SMR 1102 that multiplexes the data streams across the antenna(s) 1112 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the SMR 1102 may implement analog beamforming techniques, whereby phases of the signals sent by the antenna(s) 1112 are relatively adjusted such that the (joint) transmission of the antenna(s) 1112 can be directed (this is sometimes referred to as beam steering).

The SMR 1102 may include one or more interface(s) 1114. The interface(s) 1114 may be used to provide input to or output from the SMR 1102. For example, an SMR 1102 may include interface(s) 1114 such as microphones, speakers, a touchscreen, buttons, and the like in order to allow for input and/or output to the SMR 1102 by a user of the SMR 1102. Other interfaces of an SMR 1102 may be made up of transmitters, receivers, and other circuitry (e.g., other than the transceiver(s) 1110/antenna(s) 1112 already described) that allow for communication between the SMR 1102 and other devices and may operate according to known protocols (e.g., Wi-Fi®, Bluetooth®, and the like).

The SMR 1102 may include an SMR control module 1116. The SMR control module 1116 may be implemented via hardware, software, or combinations thereof. For example, the SMR control module 1116 may be implemented as a processor, circuit, and/or instructions 1108 stored in the memory 1106 and executed by the processor(s) 1104. In some examples, the SMR control module 1116 may be integrated within the processor(s) 1104 and/or the transceiver(s) 1110. For example, the SMR control module 1116 may be implemented by a combination of software components (e.g., executed by a DSP or a general processor) and hardware components (e.g., logic gates and circuitry) within the processor(s) 1104 or the transceiver(s) 1110.

The SMR control module 1116 may be used for various aspects of the present disclosure, for example, aspects of FIG. 1 through FIG. 10. In relation to the base station 1118, in some embodiments, the SMR control module 1116 may configure the SMR 1102 to use one or more SMR Rx beams to receive signaling (e.g., SSBs) from the base station 1118 to the UE 1136, in the manner described herein. In some embodiments, the SMR control module 1116 may configure the SMR 1102 to provide L1-RSRP feedback to the base station 1118 (e.g., as generated at the SMR 1102 and/or as provided to the SMR 1102 by the UE 1136 for relay to the base station 1118).

The base station 1118 may include one or more processor(s) 1120. The processor(s) 1120 may execute instructions such that various operations of the base station 1118 are performed, as described herein. The processor(s) 1120 may include one or more baseband processors implemented using, for example, a CPU, a DSP, an ASIC, a controller, an FPGA device, another hardware device, a firmware device, or any combination thereof configured to perform the operations described herein.

The base station 1118 may include a memory 1122. The memory 1122 may be a non-transitory computer-readable storage medium that stores instructions 1124 (which may include, for example, the instructions being executed by the processor(s) 1120). The instructions 1124 may also be referred to as program code or a computer program. The memory 1122 may also store data used by, and results computed by, the processor(s) 1120.

The base station 1118 may include one or more transceiver(s) 1126 that may include RF transmitter and/or receiver circuitry that use the antenna(s) 1128 of the base station 1118 to facilitate signaling (e.g., the signaling 1134) to and/or from the base station 1118 with other devices (e.g., the SMR 1102) according to corresponding RATs.

The base station 1118 may include one or more antenna(s) 1128 (e.g., one, two, four, or more). In embodiments having multiple antenna(s) 1128, the base station 1118 may perform MIMO, digital beamforming, analog beamforming, beam steering, etc., as has been described.

The base station 1118 may include one or more interface(s) 1130. The interface(s) 1130 may be used to provide input to or output from the base station 1118. For example, a base station 1118 that is a base station may include interface(s) 1130 made up of transmitters, receivers, and other circuitry (e.g., other than the transceiver(s) 1126/antenna(s) 1128 already described) that enables the base station to communicate with other equipment in a core network, and/or that enables the base station to communicate with external networks, computers, databases, and the like for purposes of operations, administration, and maintenance of the base station or other equipment operably connected thereto.

The base station 1118 may include an SMR control information module 1132. The SMR control information module 1132 may be implemented via hardware, software, or combinations thereof. For example, the SMR control information module 1132 may be implemented as a processor, circuit, and/or instructions 1124 stored in the memory 1122 and executed by the processor(s) 1120. In some examples, the SMR control information module 1132 may be integrated within the processor(s) 1120 and/or the transceiver(s) 1126. For example, the SMR control information module 1132 may be implemented by a combination of software components (e.g., executed by a DSP or a general processor) and hardware components (e.g., logic gates and circuitry) within the processor(s) 1120 or the transceiver(s) 1126.

The SMR control information module 1132 may be used for various aspects of the present disclosure, for example, aspects of FIG. 1 through FIG. 10. The SMR control information module 1132 may configure the base station 1118 to use one or more base station Tx beams to send signaling (e.g., SSBs) to the SMR 1102, in the manner described herein. Further, the SMR control information module 1132 may configure the base station 1118 to identify a base station Tx beam used to send an SSB that is identified in L1-RSRP feedback provided to the base station from the SMR 1102 (either directly or as relayed from a UE, as the case may be).

As illustrated in FIG. 11B, the one or more transceiver(s) 1110 of the SMR 1102 may use the antenna(s) 1112 of the SMR 1102 to facilitate the signaling 1150 to and/or from the SMR 1102 with the UE 1136.

In relation to the UE 1136, the SMR control module 1116 may configure the SMR 1102 to relay control signaling (e.g., SSBs) from the base station 1118 to the UE 1136 on one or more SMR Tx beams, in the manner described herein. Further, the SMR control module 1116 may configure the SMR 1102 to relay L1-RSRP feedback identifying an SSB from the UE 1136 to the base station 1118.

The UE 1136 may include one or more processor(s) 1138. The processor(s) 1138 may execute instructions such that various operations of the UE 1136 are performed, as described herein. The processor(s) 1138 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The UE 1136 may include a memory 1140. The memory 1140 may be a non-transitory computer-readable storage medium that stores instructions 1142 (which may include, for example, the instructions being executed by the processor(s) 1138). The instructions 1142 may also be referred to as program code or a computer program. The memory 1140 may also store data used by, and results computed by, the processor(s) 1138.

The UE 1136 may include one or more transceiver(s) 1144 that may include radio frequency (RF) transmitter and/or receiver circuitry that use the antenna(s) 1146 of the UE 1136 to facilitate signaling (e.g., the signaling 1150) to and/or from the UE 1136 with other devices (e.g., the SMR 1102) according to corresponding RATs.

The UE 1136 may include one or more antenna(s) 1146 (e.g., one, two, four, or more). In embodiments having multiple antenna(s) 1146, the UE 1136 may perform MIMO, digital beamforming, analog beamforming, beam steering, etc., as has been described.

The UE 1136 may include one or more interface(s) 1148. The interface(s) 1148 may be used to provide input to or output from the UE 1136. For example, a UE 1136 that is a UE may include interface(s) 1148 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1144/antenna(s) 1146 already described) that allow for communication between the UE and other devices and may operate according to known protocols (e.g., Wi-Fi®, Bluetooth®, and the like).

Figure 12A:
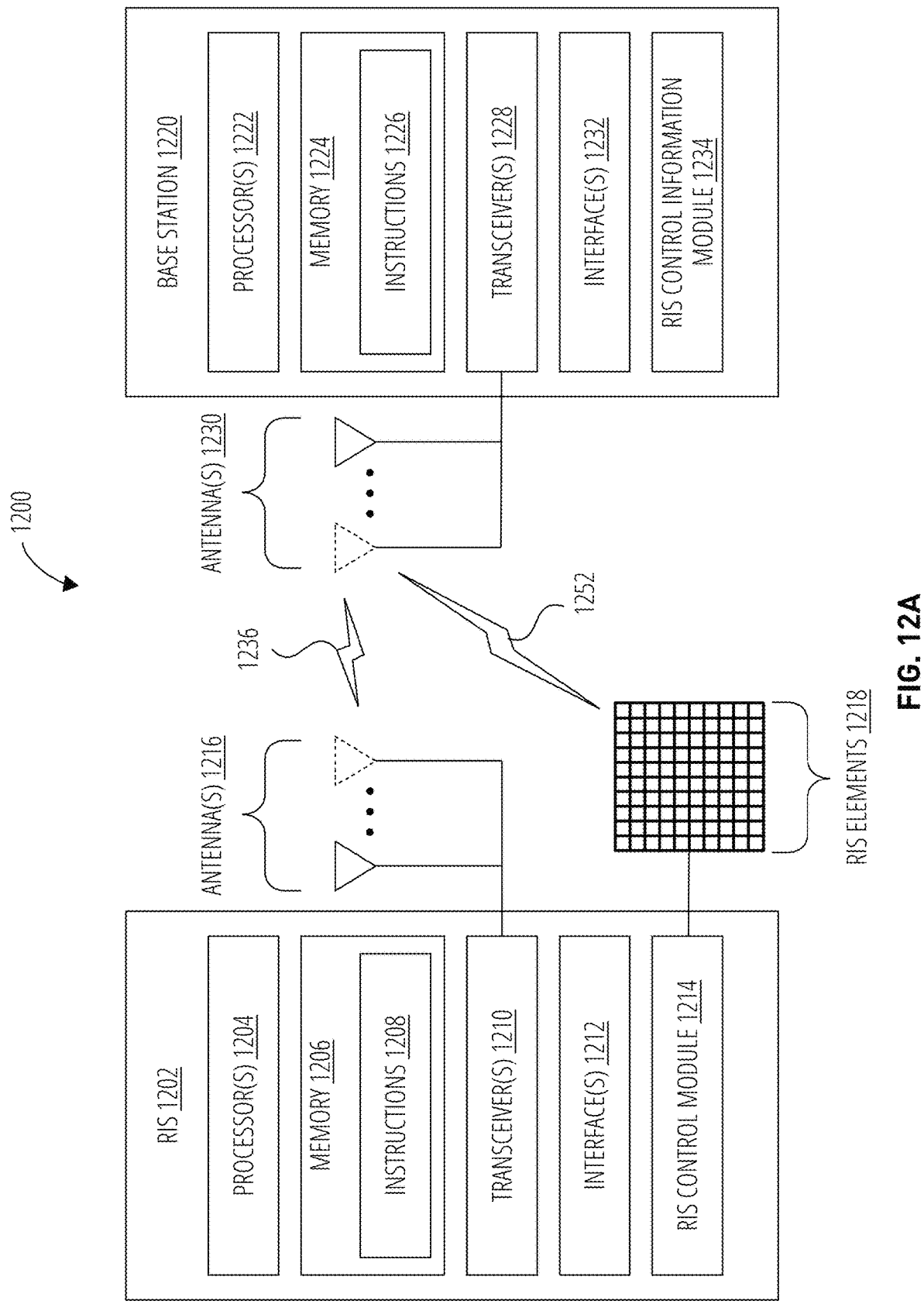
FIG. 12A and FIG. 12B together illustrate a system for performing signaling between a RIS, a base station, and a UE, according to an embodiment.
Figure 12B:
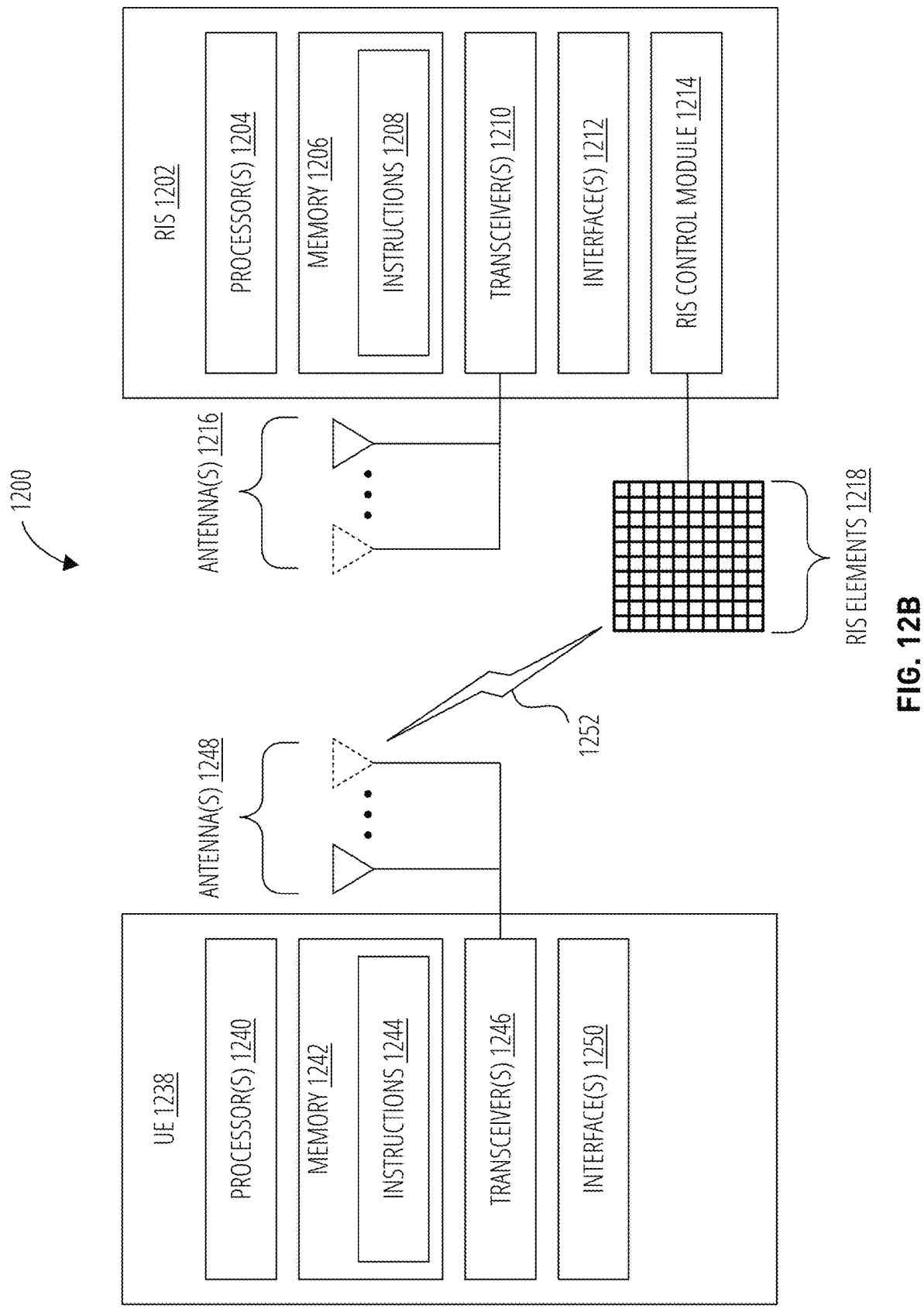

FIG. 12A and FIG. 12B together illustrate a system 1200 for performing signaling between a RIS 1202, a base station 1220, and a UE 1238, according to an embodiment. FIG. 12A illustrates the RIS 1202 and the base station 1220, and FIG. 12B illustrates the RIS 1202 and the UE 1238. The system 1200 may be a portion of a wireless communications system as herein described. The base station 1220 may be, for example, a gNB or an eNB of a wireless communication system. The UE 1238 may be, for example, a UE of a wireless communication system as contemplated herein.

As illustrated in FIG. 12A, the RIS 1202 may include one or more processor(s) 1204. The processor(s) 1204 may execute instructions such that various operations of the RIS 1202 are performed, as described herein. The processor(s) 1204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The RIS 1202 may include a memory 1206. The memory 1206 may be a non-transitory computer-readable storage medium that stores instructions 1208 (which may include, for example, the instructions being executed by the processor(s) 1204). The instructions 1208 may also be referred to as program code or a computer program. The memory 1206 may also store data used by, and results computed by, the processor(s) 1204.

The RIS 1202 may include one or more transceiver(s) 1210 that may include radio frequency (RF) transmitter and/or receiver circuitry that use the antenna(s) 1216 of the RIS 1202 to facilitate signaling (e.g., the first signaling 1236) to and/or from the RIS 1202 with other devices (e.g., the base station 1220) according to corresponding RATs.

The RIS 1202 may include one or more antenna(s) 1216. In embodiments having multiple antenna(s) 1216, the RIS 1202 may perform, for example, analog beamforming and/or beam steering, as has been described. It is noted that in some embodiments (other than illustrated in FIG. 12A and FIG.

12B), one or more of the RIS elements 1218 may be used as the one or more antenna(s) 1216.

The RIS 1202 may include one or more interface(s) 1212. The interface(s) 1212 may be used to provide input to or output from the RIS 1202. For example, a RIS 1202 may include interface(s) 1212 such as microphones, speakers, a touchscreen, buttons, and the like in order to allow for input and/or output to the RIS 1202 by a user of the RIS 1202. Other interfaces of a RIS 1202 may be made up of transmitters, receivers, and other circuitry (e.g., other than the transceiver(s) 1210/antenna(s) 1216 already described) that allow for communication between the RIS 1202 and other devices and may operate according to known protocols (e.g., Wi-Fi®, Bluetooth®, and the like).

The RIS 1202 may include a RIS control module 1214. The RIS control module 1214 may be implemented via hardware, software, or combinations thereof. For example, the RIS control module 1214 may be implemented as a processor, circuit, and/or instructions 1226 stored in the memory 1206 and executed by the processor(s) 1204. In some examples, the RIS control module 1214 may be integrated within the processor(s) 1204 and/or the transceiver(s) 1210. For example, the RIS control module 1214 may be implemented by a combination of software components (e.g., executed by a DSP or a general processor) and hardware components (e.g., logic gates and circuitry) within the processor(s) 1204 or the transceiver(s) 1210.

The RIS control module 1214 may be used for various aspects of the present disclosure, for example, aspects of FIG. 2, FIG. 6A, and FIG. 9. In relation to the base station 1220, in some embodiments, the RIS control module 1214 may configure the RIS 1202 to receive RIS control information (e.g., one or more response matrices Q and timing(s) for applying those one or more response matrices to the RIS elements 1218 of the RIS 1202) from the base station 1220 via the antenna(s) 1216 (e.g., in the first signaling 1236). In some embodiments, the RIS control module 1214 may apply the response matrices Q (at the appropriate times) to the RIS elements 1218 as instructed by the RIS control information.

As illustrated, the configuration of the RIS elements 1218 in the described manner may enable the RIS 1202 to relay the second signaling 1252 that occurs between the base station 1220 and the UE 1238, in the manner described herein. This may occur according to effective RIS beamformings corresponding to the currently configured response matrix Q, as has been described herein.

The base station 1220 may include one or more processor(s) 1222. The processor(s) 1222 may execute instructions such that various operations of the base station 1220 are performed, as described herein. The processor(s) 1222 may include one or more baseband processors implemented using, for example, a CPU, a DSP, an ASIC, a controller, an FPGA device, another hardware device, a firmware device, or any combination thereof configured to perform the operations described herein.

The base station 1220 may include a memory 1224. The memory 1224 may be a non-transitory computer-readable storage medium that stores instructions 1226 (which may include, for example, the instructions being executed by the processor(s) 1222). The instructions 1226 may also be referred to as program code or a computer program. The memory 1224 may also store data used by, and results computed by, the processor(s) 1222.

The base station 1220 may include one or more transceiver(s) 1228 that may include RF transmitter and/or receiver circuitry that use the antenna(s) 1230 of the base station 1220 to facilitate signaling (e.g., the first signaling 1236) to and/or from the base station 1220 with other devices (e.g., the RIS 1202) according to corresponding RATs.

The base station 1220 may include one or more antenna(s) 1230 (e.g., one, two, four, or more). In embodiments having multiple antenna(s) 1230, the base station 1220 may perform MIMO, digital beamforming, analog beamforming, beam steering, etc., as has been described.

The base station 1220 may include one or more interface(s) 1232. The interface(s) 1232 may be used to provide input to or output from the base station 1220. For example, a base station 1220 that is a base station may include interface(s) 1232 made up of transmitters, receivers, and other circuitry (e.g., other than the transceiver(s) 1228/antenna(s) 1230 already described) that enables the base station to communicate with other equipment in a core network, and/or that enables the base station to communicate with external networks, computers, databases, and the like for purposes of operations, administration, and maintenance of the base station or other equipment operably connected thereto.

The base station 1220 may include a RIS control information module 1234. The RIS control information module 1234 may be implemented via hardware, software, or combinations thereof. For example, the RIS control information module 1234 may be implemented as a processor, circuit, and/or instructions 1226 stored in the memory 1224 and executed by the processor(s) 1222. In some examples, the RIS control information module 1234 may be integrated within the processor(s) 1222 and/or the transceiver(s) 1228. For example, the RIS control information module 1234 may be implemented by a combination of software components (e.g., executed by a DSP or a general processor) and hardware components (e.g., logic gates and circuitry) within the processor(s) 1222 or the transceiver(s) 1228.

The RIS control information module 1234 may be used for various aspects of the present disclosure, for example, aspects of FIG. 2, FIG. 6A, and FIG. 9. The RIS control information module 1234 may configure the base station 1220 to send response matrices Q (and corresponding timings for applying the same) to the RIS 1202 in the first signaling 1236. Further, the RIS control information module 1234 may configure the base station 1220 to communicate with the UE 1238 using the second signaling 1252 that is relayed by the RIS 1202 using the RIS elements 1218, in the manner described herein.

As illustrated in FIG. 12B, in relation to the UE 1238, the RIS elements 1218 may relay the second signaling 1252 between the UE 1238 and the base station 1220 as configured by the RIS control module 1214, in the manner described herein.

As illustrated, it may be that the antenna(s) 1216 of the RIS 1202 may not be used to communicate with the UE 1238.

The UE 1238 may include one or more processor(s) 1240. The processor(s) 1240 may execute instructions such that various operations of the UE 1238 are performed, as described herein. The processor(s) 1240 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The UE 1238 may include a memory 1242. The memory 1242 may be a non-transitory computer-readable storage medium that stores instructions 1244 (which may include, for example, the instructions being executed by the processor(s) 1240). The instructions 1244 may also be referred to as program code or a computer program. The memory 1242 may also store data used by, and results computed by, the processor(s) 1240.

The UE 1238 may include one or more transceiver(s) 1246 that may include radio frequency (RF) transmitter and/or receiver circuitry that use the antenna(s) 1248 of the UE 1238 to facilitate signaling (e.g., the second signaling 1252)) to and/or from the UE 1238 with other devices (e.g., the RIS 1202) according to corresponding RATs. For example, as illustrated, the antenna(s) 1248 may facilitate the second signaling 1252 as between the RIS 1202 and the UE 1238, such that the second signaling 1252 may eventually be relayed by the RIS 1202 to the base station 1220.

The UE 1238 may include one or more antenna(s) 1248 (e.g., one, two, four, or more). In embodiments having multiple antenna(s) 1248, the UE 1238 may perform MIMO, digital beamforming, analog beamforming, beam steering, etc., as has been described.

The UE 1238 may include one or more interface(s) 1250. The interface(s) 1250 may be used to provide input to or output from the UE 1238. For example, a UE 1238 that is a UE may include interface(s) 1250 such as microphones, speakers, a touch screen, buttons, and the like in order to allow for input and/or output to the UE by a user of the UE. Other interfaces of such a UE may be made up of made up of transmitters, receivers, and other circuitry (e.g., other than the transceiver(s) 1246/antenna(s) 1248 already described) that allow for communication between the UE and other devices and may operate according to known protocols (e.g., Wi-Fi®, Bluetooth®, and the like).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a smart repeater (SMR), comprising:
 performing a first phase, comprising:
  receiving, from a base station, one or more first synchronization signal (SS) bursts of a first SS burst set;
  identifying a trained SMR receive (Rx) beam based on a signal quality of a first SS block (SSB) of the first SS burst set received in one of the one or more first SS bursts; and
  sending, to the base station, a first feedback message identifying the first SSB; and
 performing a second phase, comprising:
  receiving, using the trained SMR Rx beam, a second SS burst set;
  sending, to a user equipment (UE), one or more second SS bursts of the second SS burst set, whereby a plurality of SSBs of the second SS burst set are sent in each of the one or more second SS bursts using a beam sweep of respective SMR transmit (Tx) beams;
  receiving, from the UE, a second feedback message identifying a second SSB from the second SS burst set; and
  relaying, to the base station, the second feedback message.

2. The method of claim 1, wherein:
 the first phase is performed according to a first periodicity, and
 the second phase is performed according to a second periodicity that is shorter than the first periodicity.

3. The method of claim 1, wherein identifying the trained SMR Rx beam based on the signal quality of the first SSB comprises:
 identifying the first SSB as received with a highest signal quality of all SSBs received in the one or more first SS bursts; and
 identifying that the first SSB was received with the highest signal quality on the trained SMR Rx beam.

4. The method of claim 1, further comprising:
 performing a third phase, comprising:
  receiving user plane data for the UE from the base station on the trained SMR Rx beam; and sending the user plane data to the UE on an SMR Tx beam corresponding to the second SSB.

5. The method of claim 1, further comprising receiving, from the base station, control signaling corresponding to data relaying between the base station and the UE via the SMR.

6. The method of claim 5, wherein the control signaling comprises a time division duplex (TDD) configuration between the base station and the UE.

7. The method of claim 5, wherein the control signaling comprises:
- an indication of one of a new SMR Rx beam to use to receive transmissions from the base station and of a new SMR Tx beam to use to send transmissions to the base station; and
- a validity duration for the one of the new SMR Rx beam and the new SMR Tx beam.

8. The method of claim 5, wherein the control signaling comprises:
- an indication of one of a new SMR Rx beam to use to receive transmissions from the UE and of a new SMR Tx beam to use to send transmissions to the UE; and
- a validity duration for the one of the new SMR Rx beam and the new SMR Tx beam.

9. The method of claim 5, wherein the control signaling comprises power state information for the SMR.

10. The method of claim 9, wherein the power state information corresponds to a time division duplex (TDD) configuration between the base station and the UE.

11. The method of claim 9, wherein the power state information enables data reception at the SMR from the base station during the first phase.

12. The method of claim 9, wherein the power state information enables data transmission from the SMR to the base station during the first phase.

13. The method of claim 1, further comprising sending, to the base station, a message containing SMR codebook information that controls a number of the plurality of SSBs of the second SS burst set.

14. A method of a smart repeater (SMR), comprising:
- receiving, from a base station, on a first SMR receive (Rx) beam, a first portion of a synchronization signal (SS) an SS burst of an SS burst set;
- relaying, to a user equipment (UE), the first portion of the SS burst, whereby a plurality of SS blocks (SSBs) of the first portion of the SS burst are forwarded using a beam sweep of respective SMR transmit (Tx) beams of a set of SMR Tx beams;
- receiving, from the base station, on a second SMR Rx beam, a second portion of the SS burst;
- relaying, to the UE, the second portion of the SS burst, whereby a plurality of SSBs of the second portion of the SS burst are forwarded using a beam sweep of respective SMR Tx beams of the set of SMR Tx beams;
- receiving, from the UE, a feedback message identifying a first SSB of one of the first portion of the SS burst of the SS burst set or the second portion of the SS burst of the SS burst set; and
- relaying, to the base station, the feedback message.

15. The method of claim 14, wherein:
- the plurality of SSBs of the first portion of the SS burst occupy respective ones of a set of base station Tx beams; and
- the plurality of SSBs of the second portion of the SS burst occupy respective ones of the set of base station Tx beams.

16. The method of claim 14, wherein:
- two or more of the plurality of SSBs of the first portion of the SS burst occupy a first base station Tx beam; and
- two or more of the plurality of SSBs of the second portion of the SS burst occupy a second base station Tx beam.

17. A method of a reconfigurable intelligent surface (RIS), comprising:
- receiving, from a base station, on a first RIS receive (Rx) beam, a first portion of a synchronization signal (SS) burst of an SS burst set;
- relaying, to a user equipment (UE), the first portion of the SS burst, whereby a plurality of SS blocks (SSBs) of the first portion of the SS burst are forwarded using a beam sweep of respective RIS transmit (Tx) beams of a set of RIS Tx beams;
- receiving, from the base station, on a second RIS Rx beam, a second portion of the SS burst;
- relaying, to the UE, the second portion of the SS burst, whereby a plurality of SSBs of the second portion of the SS burst are forwarded using a beam sweep of respective RIS Tx beams of the set of RIS Tx beams;
- receiving, from the UE, a feedback message identifying a first SSB of one of the first portion of the SS burst of the SS burst set or the second portion of the SS burst of the SS burst set; and
- relaying, to the base station, the feedback message.

18. The method of claim 17, wherein:
- the plurality of SSBs of the first portion of the SS burst occupy respective ones of a set of base station Tx beams; and
- the plurality of SSBs of the second portion of the SS burst occupy respective ones of the set of base station Tx beams.

19. The method of claim 17, wherein:
- two or more of the plurality of SSBs of the first portion of the SS burst occupy a first base station Tx beam; and
- two or more the plurality of SSBs of the second portion of the SS burst occupy a second base station Tx beam.

20. The method of claim 17, further comprising:
- receiving control signaling comprising an RIS response matrix configuring the RIS to use the set of RIS Tx beams, the first RIS Rx beam, and the second RIS Rx beam; and
- applying the RIS response matrix from the control signaling at the RIS.

* * * * *